United States Patent
Widman et al.

(10) Patent No.: US 9,075,186 B2
(45) Date of Patent: *Jul. 7, 2015

(54) FREE FORM LENS WITH REFRACTIVE INDEX VARIATIONS

(75) Inventors: Michael F. Widman, Jacksonville, FL (US); John B. Enns, Jacksonville, FL (US); P. Mark Powell, Jacksonville, FL (US); Peter W. Sites, Orange Park, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 46 days.

This patent is subject to a terminal disclaimer.

(21) Appl. No.: 13/435,668

(22) Filed: Mar. 30, 2012

(65) Prior Publication Data

US 2012/0187589 A1  Jul. 26, 2012

Related U.S. Application Data

(62) Division of application No. 12/729,334, filed on Mar. 23, 2010, now Pat. No. 8,240,849.

(60) Provisional application No. 61/164,995, filed on Mar. 31, 2009.

(51) Int. Cl.
    *B29D 11/00* (2006.01)
    *G02B 1/04* (2006.01)

(52) U.S. Cl.
    CPC .......... *G02B 1/043* (2013.01); *B29D 11/00028* (2013.01)

(58) Field of Classification Search
    CPC .......................... B29D 11/00028; G02B 1/043
    USPC ................ 264/1.36, 1.37, 1.38, 1.7, 494, 496
    IPC ................ B29D 11/00019,11/00153, 11/00355
    See application file for complete search history.

(56) References Cited

U.S. PATENT DOCUMENTS

| | | | |
|---|---|---|---|
| 3,959,102 A | 5/1976 | Wajs |
| 4,701,288 A | 10/1987 | Cook |
| 5,114,628 A | 5/1992 | Hofer |
| 5,166,710 A | 11/1992 | Hofer |
| 5,200,121 A | 4/1993 | Hagmann |
| 5,296,305 A | 3/1994 | Baude |
| 5,396,045 A | 3/1995 | Opdyke |
| 5,452,031 A | 9/1995 | Ducharme |
| 5,502,518 A | 3/1996 | Lieberman |

(Continued)

FOREIGN PATENT DOCUMENTS

| CN | 1299387 | 11/1999 |
|---|---|---|
| CN | 1732024 | 7/2004 |

(Continued)

OTHER PUBLICATIONS

Cabral, J.T., et al; Propagating waves of network formation induced by light, Polymer 46 (2005) pp. 4230-4241.

*Primary Examiner* — Mathieu Vargot

(57) ABSTRACT

This invention provides for method of forming an ophthalmic lens with at least one portion of the lens including multiple voxels of polymerized crosslinkable material. In addition, the present invention provides for apparatus for generating an ophthalmic lens with one or more areas of different refractive indexes and a surface with one or both of a raised area and a depressed area.

15 Claims, 19 Drawing Sheets

(56) References Cited

U.S. PATENT DOCUMENTS

| | | | |
|---|---|---|---|
| 5,517,260 A | 5/1996 | Glady | |
| 5,662,706 A | 9/1997 | Legerton | |
| 5,685,420 A | 11/1997 | Martin | |
| 5,983,201 A | 11/1999 | Fay | |
| 6,086,204 A | 7/2000 | Magnante | |
| 6,139,147 A * | 10/2000 | Zhang | 351/159.41 |
| 6,142,628 A | 11/2000 | Saigo | |
| 6,145,988 A | 11/2000 | Manfredini | |
| 6,233,102 B1 | 5/2001 | Hogan, Jr. | |
| 6,241,355 B1 | 6/2001 | Barsky | |
| 6,305,802 B1 | 10/2001 | Roffman | |
| 6,340,229 B1 | 1/2002 | Lieberman | |
| 6,413,251 B1 | 7/2002 | Williams | |
| 6,457,826 B1 | 10/2002 | Lett | |
| 6,471,891 B1 | 10/2002 | Cameron | |
| 6,499,843 B1 | 12/2002 | Cox | |
| 6,520,958 B1 | 2/2003 | Shimmick | |
| 6,595,639 B1 | 7/2003 | Ho | |
| 6,598,975 B2 | 7/2003 | Liang | |
| 6,616,275 B1 | 9/2003 | Dick | |
| 6,626,534 B1 | 9/2003 | DiMartino | |
| 6,935,743 B2 | 8/2005 | Shadduck | |
| 6,966,649 B2 | 11/2005 | Shadduck | |
| 7,029,119 B2 | 4/2006 | Youssefi | |
| 7,172,285 B1 | 2/2007 | Altmann | |
| 7,293,871 B2 | 11/2007 | Dreher | |
| 7,350,920 B2 | 4/2008 | Levine | |
| 7,384,146 B2 | 6/2008 | Covannon | |
| 7,905,594 B2 | 3/2011 | Widman | |
| 8,318,055 B2 * | 11/2012 | Widman et al. | 264/1.38 |
| 2002/0024631 A1 | 2/2002 | Roffman | |
| 2002/0071094 A1 | 6/2002 | Roffman | |
| 2002/0071097 A1 | 6/2002 | Ross | |
| 2002/0140902 A1 | 10/2002 | Guirao | |
| 2002/0154271 A1 | 10/2002 | Donitzky | |
| 2003/0007123 A1 | 1/2003 | Broderick | |
| 2003/0053031 A1 | 3/2003 | Wirth | |
| 2003/0117580 A1 | 6/2003 | Franz | |
| 2003/0128336 A1 | 7/2003 | Jethmalani | |
| 2004/0015261 A1 | 1/2004 | Hofmann | |
| 2004/0046287 A1 * | 3/2004 | Andino et al. | 264/401 |
| 2004/0046931 A1 | 3/2004 | Legerton | |
| 2004/0054358 A1 | 3/2004 | Cox | |
| 2004/0064376 A1 | 4/2004 | Yoshida | |
| 2004/0100619 A1 | 5/2004 | Olivier | |
| 2004/0119174 A1 | 6/2004 | Hofmann | |
| 2004/0169820 A1 | 9/2004 | Dai | |
| 2004/0169932 A1 | 9/2004 | Esch | |
| 2004/0179167 A1 | 9/2004 | Dahi | |
| 2004/0215525 A1 | 10/2004 | Keane | |
| 2004/0222539 A1 | 11/2004 | Hagmann | |
| 2004/0233382 A1 | 11/2004 | Lindacher | |
| 2004/0246440 A1 | 12/2004 | Andino | |
| 2004/0263779 A1 | 12/2004 | Schroder | |
| 2004/0263785 A1 | 12/2004 | Chernyak | |
| 2005/0041203 A1 | 2/2005 | Lindacher | |
| 2005/0060196 A1 | 3/2005 | Tsushi | |
| 2005/0068489 A1 | 3/2005 | Hall | |
| 2005/0073648 A1 | 4/2005 | Toshima | |
| 2005/0074616 A1 | 4/2005 | Harchanko | |
| 2005/0098478 A1 | 5/2005 | Gupta | |
| 2005/0099595 A1 | 5/2005 | Lindacher | |
| 2005/0105044 A1 | 5/2005 | Warden | |
| 2005/0105045 A1 | 5/2005 | Legerton | |
| 2005/0105048 A1 | 5/2005 | Warden | |
| 2005/0122472 A1 | 6/2005 | Fisher | |
| 2005/0131398 A1 | 6/2005 | Campbell | |
| 2005/0219461 A1 | 10/2005 | Hirohara | |
| 2005/0259221 A1 | 11/2005 | Marmo | |
| 2005/0264756 A1 | 12/2005 | Esch | |
| 2005/0275137 A1 | 12/2005 | Stolpe | |
| 2006/0001184 A1 | 1/2006 | Phelan | |
| 2006/0055071 A1 | 3/2006 | Kendig | |
| 2006/0055884 A1 | 3/2006 | Molinari | |
| 2006/0173644 A1 | 8/2006 | Dai | |
| 2006/0192310 A1 | 8/2006 | Lindacher | |
| 2006/0192919 A1 | 8/2006 | Lindacher | |
| 2006/0232743 A1 | 10/2006 | Legerton | |
| 2006/0256451 A1 | 11/2006 | Schaack | |
| 2006/0264917 A1 | 11/2006 | Tuan | |
| 2006/0268225 A1 | 11/2006 | Lieberman | |
| 2006/0279696 A1 | 12/2006 | Perez | |
| 2007/0023942 A1 | 2/2007 | Andino | |
| 2007/0038202 A1 | 2/2007 | Celestino | |
| 2007/0091259 A1 | 4/2007 | Svochak | |
| 2007/0097318 A1 | 5/2007 | Chehab | |
| 2007/0109497 A1 | 5/2007 | Chang | |
| 2007/0132949 A1 | 6/2007 | Phelan | |
| 2007/0273828 A1 | 11/2007 | Polland | |
| 2007/0274626 A1 | 11/2007 | Sabeta | |
| 2007/0284770 A1 | 12/2007 | Ansell | |
| 2008/0013043 A1 | 1/2008 | Ye | |
| 2008/0017977 A1 | 1/2008 | Tseng | |
| 2008/0055545 A1 | 3/2008 | Clamp | |
| 2008/0067702 A1 | 3/2008 | Yao | |
| 2008/0079184 A1 | 4/2008 | Yin | |
| 2008/0079895 A1 | 4/2008 | Jubin | |
| 2008/0137030 A1 | 6/2008 | Hoffman | |
| 2008/0143003 A1 | 6/2008 | Phelan | |
| 2008/0143004 A1 | 6/2008 | De Wilt | |
| 2008/0143960 A1 | 6/2008 | MacRae | |
| 2008/0143963 A1 | 6/2008 | Lindacher | |
| 2008/0165324 A1 | 7/2008 | Lindacher | |
| 2008/0179770 A1 | 7/2008 | Rooney | |
| 2008/0192201 A1 | 8/2008 | Wengler | |
| 2008/0252845 A1 | 10/2008 | Dreher et al. | |
| 2008/0277811 A1 | 11/2008 | Miller | |
| 2008/0288369 A1 | 11/2008 | Hunter | |
| 2008/0291395 A1 | 11/2008 | Dai | |
| 2008/0306573 A1 | 12/2008 | Campin | |
| 2008/0309873 A1 | 12/2008 | Levecq | |
| 2009/0022274 A1 | 1/2009 | Gertner | |
| 2009/0033920 A1 | 2/2009 | Simpson | |
| 2009/0051059 A1 | 2/2009 | Widman | |

FOREIGN PATENT DOCUMENTS

| | | |
|---|---|---|
| CN | 101031409 | 2/2006 |
| CN | 101052703 | 5/2006 |
| EP | 322353 | 6/1989 |
| EP | 637491 A1 | 2/1995 |
| EP | 637491 B1 | 11/1997 |
| EP | 1750162 A2 | 2/2007 |
| EP | 1552336 B1 | 10/2008 |
| JP | 2001290978 A | 10/2001 |
| JP | 2002078681 A | 3/2002 |
| JP | 2002357796 A | 12/2002 |
| JP | 2003295134 A | 10/2003 |
| WO | WO 9729441 A1 | 8/1997 |
| WO | WO 9842497 A2 | 10/1998 |
| WO | WO 9842497 A3 | 10/1998 |
| WO | WO 0102881 | 1/2001 |
| WO | WO 0233628 A2 | 4/2002 |
| WO | WO 03013832 | 2/2003 |
| WO | WO 03037716 A2 | 5/2003 |
| WO | WO 2004039554 A2 | 5/2004 |
| WO | WO 2005005121 A2 | 1/2005 |
| WO | WO 2005005121 A3 | 1/2005 |
| WO | WO 2005007386 A2 | 1/2005 |
| WO | WO 2005007386 A3 | 1/2005 |
| WO | WO 2005098478 A1 | 10/2005 |
| WO | WO 2006010632 A1 | 2/2006 |
| WO | WO 2009025845 A1 | 2/2009 |
| WO | WO 2010088266 A1 | 8/2010 |
| WO | WO 2010101831 A1 | 9/2010 |

* cited by examiner

FREE FORM LENS WITH REFRACTIVE INDEX VARIATIONS

RELATED APPLICATIONS

This application is a divisional of U.S. patent application Ser. No. 12/729,334 filed Mar. 23, 2010, now U.S. Pat. No. 8,240,849, which claims priority of U.S. Patent Application Ser. No. 61/164,995 filed Mar. 31, 2009.

FIELD OF USE

This invention describes method for the fabrication of ophthalmic lenses and, more specifically, in some embodiments, the formation of an ophthalmic lens with a free form surface and areas of different refractive index.

BACKGROUND OF THE INVENTION

It is known to fabricate ophthalmic lenses via cast molding techniques in which a monomer material is deposited in a cavity defined between optical surfaces of two or more opposing mold parts. Multi-part molds used to fashion hydrogels into a useful article, such as an ophthalmic lens, can include for example, a first mold part with a convex portion that corresponds with a back curve of an ophthalmic lens and a second mold part with a concave portion that corresponds with a front curve of the ophthalmic lens.

To prepare a lens using such mold parts, an uncured hydrogel lens formulation is placed between a plastic disposable front curve mold part and a plastic disposable back curve mold part and polymerized. However, a design of an ophthalmic lens derived therefrom is limited to a design of the mold utilized.

It is desirable therefore to have additional methods and apparatus conducive to the formation of an ophthalmic lens of a predetermined size and shape such that it can be customized to one or both of a specific patient or purpose.

SUMMARY OF THE INVENTION

The present invention is directed to methods of forming an ophthalmic Lens including a first portion that includes multiple voxels of polymerized crosslinkable material and a second portion with a layered volume of crosslinkable material polymerized above a gel point. In addition, different areas of a lens formed according to the present invention may include different refractive indexes to further facilitate vision correction.

Generally, a Reactive Mixture including a photoabsorptive component is exposed to source of actinic radiation via a substrate with an arcuate surface. At least a portion of the arcuate surface can include an optical quality surface. The actinic radiation is controllable to cure a portion of the Reactive Mixture in a predefined pattern. The predefined pattern can include one surface formed along the optical quality substrate surface and a second surface free formed within the volume of Reactive Mixture.

A lens according to the present invention may include a photoabsorptive component. The photoabsorptive component can be useful in the formation of the multiple voxels. Each voxel may include a first end and a second end and the second portion may include a layered volume of crosslinkable material polymerized above the gel point essentially covers each second end. Various embodiments can include an optical surface in one or both of the first portion and the second portion.

Voxels of polymerized lens material may be formed via exposure of a crosslinkable material to multiple rays of actinic radiation, each ray of actinic radiation originating from a source and reflected towards a predetermined portion of the reactive mixture for a predetermined amount of time. Each ray of actinic radiation can be reflected towards a predetermined portion of the reactive mixture for a predetermined amount of time comprises a predetermined wavelength. In some embodiments, the second portion is formed via exposure of a reactive mixture to multiple rays of actinic radiation originating from multiple points.

Some additional embodiments may include a Lens with one or more features such as: troughs formed by the voxels of polymerized crosslinkable material; one or more elevated areas formed by the voxels of polymerized crosslinkable material. Lenses formed according to the present invention may be spherical or non-spherical. The first surface may include an optical quality optic zone and the second surface may include an artifacts.

In some embodiments, the Lens can be formed from a Lens Precursor comprising both fluent and structural regions. In a preferred embodiment, the structural regions are in large part determined by the operation of the Voxel lithographic section; however the fluent region can be determined in numerous ways while also being influenced by the Voxel lithographic section. Alternative embodiments may form a lens from the effect of the Voxel lithographic section without going through the Lens Precursor intermediate product.

DETAILED DESCRIPTION OF THE INVENTION

Figure 1:
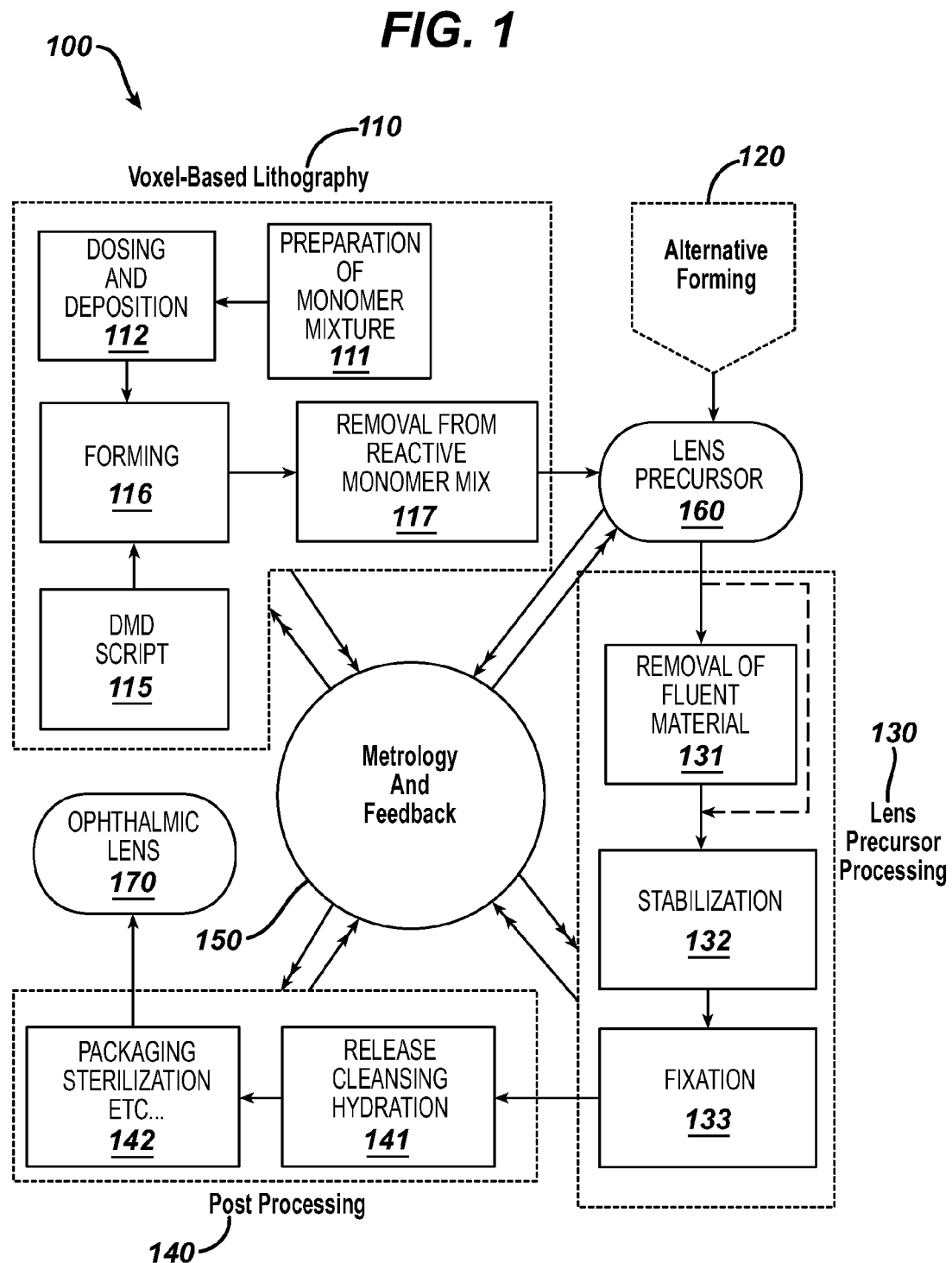
FIG. 1 illustrates method steps that may be used to implement some embodiments of the preset invention.

The present invention provides for methods and apparatus for forming a Lens and for forming a Lens Precursor. In the following sections detailed descriptions of embodiments of the invention will be given. The description of both preferred and alternative embodiments though thorough, are exemplary embodiments only, and it is understood that to those skilled in the art that variations, modifications and alterations may be apparent. It is therefore to be understood that the exemplary embodiments do not limit the broadness of the aspects of the underlying invention as defined by the claims.

Glossary

In this description and claims directed to the presented invention, various terms may be used for which the following definitions will apply:

"Actinic Radiation" as used herein, refers to radiation that is capable of initiating a chemical reaction.

"Arcuate" as used herein, refers to a curve or bend like a bow.

"Beer's Law" as referred to herein and sometimes referred to as "Beers-Lambert Law" is: $I(x)/I0=\exp(-\alpha cx)$, wherein $I(x)$ is the intensity as a function of distance x from the irradiated surface, I0 is the incident intensity at the surface, $\alpha$ is the absorption coefficient of the absorbing component, and c is the concentration of the absorbing component.

"Collimate" as used herein means to limit the cone angle of radiation, such as light that proceeds as output from an apparatus receiving radiation as an input; in some embodiments the cone angle may be limited such that proceeding light rays are parallel. Accordingly, a "collimator" includes an apparatus that performs this function and "collimated" describes the effect on radiation.

"DMD" as used herein, a digital micromirror device is a bistable spatial light modulator consisting of an array of movable micromirrors functionally mounted over a CMOS SRAM. Each mirror is independently controlled by loading data into the memory cell below the mirror to steer reflected light, spatially mapping a pixel of video data to a pixel on a display. The data electrostatically controls the mirror's tilt angle in a binary fashion, where the mirror states are either +X degrees (on) or −X degrees (off). For current devices, X can be either 10 degrees or 12 degrees (nominal). Light reflected by the on mirrors then is passed through a projection lens and onto a screen. Light is reflected off to create a dark field, and defines the black-level floor for the image. Images are created by gray-scale modulation between on and off levels at a rate fast enough to be integrated by the observer. The DMD (digital micromirror device) is sometimes DLP projection systems.

"DMD Script" as used herein shall refer to a control protocol for a spatial light modulator and also to the control signals of any system component, such as, for example, a light source or filter wheel either of which may include a series of command sequences in time. Use of the acronym DMD is not meant to limit the use of this term to any one particular type or size of spatial light modulator.

"Fixing Radiation" as used herein, refers to Actinic Radiation sufficient to one or more of: polymerize and crosslink essentially all Reactive Mixture comprising a Lens Precursor or lens.

"Fluent Lens Reactive Media" as used herein means a Reactive Mixture that is flowable in either its native form, reacted form, or partially reacted form and is formed upon further processing into a part of an ophthalmic lens.

"Free-form" as used herein "free-formed" or "free-form" refers to a surface that is formed by crosslinking of a Reactive Mixture and is not shaped according to a cast mold.

"Gel Point" as used herein shall refer to the point at which a gel or insoluble fraction is first observed. Gel point is the extent of conversion at which the liquid polymerization mixture is crosslinked to the extent that it becomes a solid. Gel point can be determined using a soxhlet experiment: Polymer reaction is stopped at different time points and the resulting polymer is analyzed to determine the weight fraction of residual insoluble polymer. The data can be extrapolated to the point where no gel is present. This point where no gel is present is the gel point. The gel point may also be determined by analyzing the viscosity of the reaction mixture during the reaction. The viscosity can be measured using a parallel plate rheometer, with the reaction mixture between the plates. At least one plate should be transparent to radiation at the wavelength used for polymerization. The point at which the viscosity approaches infinity is the gel point. Gel point occurs at the same degree of conversion for a given polymer system and specified reaction conditions.

"Lens" as used herein "lens" refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

"Lens Precursor" as used herein, means a composite object consisting of a Lens Precursor Form and a Fluent Lens Reactive Mixture in contact with the Lens Precursor Form. For example, in some embodiments Fluent Lens Reactive Media is formed in the course of producing a Lens Precursor Form within a volume of Reactive Mixture. Separating the Lens Precursor Form and adhered Fluent Lens Reactive Media from a volume of Reactive Mixture used to produce the Lens Precursor Form can generate a Lens Precursor. Additionally, a Lens Precursor can be converted to a different entity by either the removal of significant amounts of Fluent Lens Reactive Mixture or the conversion of a significant amount of Fluent Lens Reactive Media into non-fluent incorporated material.

"Lens Precursor Form" as used herein, means a non-fluent object with at least one optical quality surface which is consistent with being incorporated upon further processing into an ophthalmic lens.

"Lens Forming Mixture" as used herein, may be interchangeably used with "Reactive Mixture"; "reactive monomer mixture" or "crosslinkable material" refers to a monomer or prepolymer material which can be cured and/or crosslinked to form an ophthalmic lens or portion of an ophthalmic lens. Various embodiments can include lens forming mixtures with one or more additives such as: UV blockers, tints, photoinitiators or catalysts, and other additives one might desire in an ophthalmic lenses such as, contact or intraocular lenses.

"Mold" as used herein, refers to a rigid or semi-rigid object that may be used to form lenses from uncured formulations. Some preferred molds include two mold parts forming a front curve mold part and a back curve mold part.

"Radiation Absorbing Component" as used herein, the term refers to radiation-absorbing component which can be combined in a reactive monomer mix formulation and which can absorb radiation in a specific wavelength range.

"Reactive Mixture" (also sometimes referred to herein as: Lens Forming Mixture, crosslinkable media or Reactive Monomer Mixture and with same meaning as "Lens Forming Mixture".

"Release from a mold" as used herein, "release from a mold," means that a lens becomes either completely separated from the mold, or is only loosely attached so that it can be removed with mild agitation or pushed off with a swab.

"Stereolithographic Lens Precursor" as used herein means a Lens Precursor where the Lens Precursor Form has been formed by use of a stereolithographic technique.

"Substrate" A physical entity upon which other entities are placed or formed.

"Transient Lens Reactive Media" as used herein means a Reactive Mixture that may remain in fluent or non-fluent form on a Lens Precursor Form. However, Transient Lens Reactive Media is significantly removed by one or more of: cleaning, solvating and hydration steps before it becomes incorporated into an ophthalmic lens. Therefore, for clarity, the combination of a Lens Precursor Form and the transient lens Reactive Mixture does not constitute a Lens Precursor.

"Voxel" as used herein "Voxel" or "Actinic Radiation Voxel" is a volume element, representing a value on a regular grid in three-dimensional space. A Voxel can be viewed as a three dimensional pixel, however, wherein a pixel represents 2D image data a Voxel includes a third dimension. In addition, wherein Voxels are frequently used in the visualization and analysis of medical and scientific data, in the present invention, a Voxel is used to define the boundaries of an amount of actinic radiation reaching a particular volume of Reactive Mixture, thereby controlling the rate of crosslinking or polymerization of that specific volume of Reactive Mixture. By way of example, Voxels are considered in the present invention as existing in a single layer conformal to a 2-D mold surface wherein the Actinic Radiation may be directed normal to the 2-D surface and in a common axial dimension of each Voxel. As an example, specific volume of Reactive Mixture may be crosslinked or polymerized according to 768×768 Voxels.

"Voxel-based Lens Precursor" as used herein "Voxel-based Lens Precursor" means a Lens Precursor where the Lens Precursor Form has been formed by use of a Voxel-based lithographic technique.

"Xgel" as used herein, Xgel is the extent of chemical conversion of a crosslinkable Reactive Mixture at which the gel fraction becomes greater than zero.

Referring to FIG. 1, a block diagram 100 of some embodiments of the present invention is illustrated. Various aspects include, for example: a voxel-based lithography methodology 110; alternative forming methodology 120; Lens Precursor processing methodology 130; post processing methodology 140; and metrology and feedback methodology 150. Two articles are identified in the block diagram, including a Lens Precursor 160; and an ophthalmic Lens 170.

Methods and apparatus for forming a Lens Precursor and an ophthalmic Lens 170 are described in detail in co-pending U.S. patent applications: Methods and apparatus for forming a Lens Precursor and an ophthalmic Lens 170 are described in detail in co-pending U.S. patent application Ser. No. 12/194,981 filed, Aug. 20, 2008 and entitled, "Apparatus for Formation of an Ophthalmic Lens Precursor and Lens" and U.S. patent application Ser. No. 12/195,132 filed, Aug. 20, 2008 and entitled, "Methods for Formation of an Ophthalmic Lens Precursor and Lens" and U.S. patent application Ser. No. 12/363,138 filed Jan. 30, 2009 and entitled "Ophthalmic Lens Precursor and Lens" and U.S. patent application Ser. No. 12/396,019 filed Mar. 2, 2009 and entitled "Free Form Ophthalmic Lens" the contents of each are relied upon and incorporated herein by reference.

As presented, arrows with a single flow may include a general direction that some embodiments may take, and arrows with two heads on them depict that some or all of, materials, data and information can flow from the various methodology sections to and from the core measurement and feedback section.

Voxel-based Lithography Methodologies.

Referring now again to FIG. 1, voxel-based lithography methods 110, an initial step in making a Lens according to some embodiments of the present invention, includes inputting lens parameters into a computer or other processor for executing an algorithmic calculation. In some embodiments, such parameters may be obtained by measuring optical aberrations on an ophthalmic patient's optical surfaces, or other physical or neurological aspects of the patient's vision system. These measurements can be turned into required wavefront characteristics for a Lens formed. In other embodiments there may be theoretical lens wavefront characteristics that may be input into an algorithm to determine lens production parameters.

At 115, an algorithm takes the above-mentioned input parameters, and in some embodiments correlates the parameters to previously produced lenses. A series of "frames" may now be determined for the exposure "movie" or script that will be communicated to the spatial light modulator.

There may also be numerous methodologies that can be used to convert an algorithmic output for a particular voxel element into the planned light reflection profile in time that would include the "DMD" script. By way of example, a total intensity value desired by the algorithm may be delivered to a voxel location at the reactive mixture as a series of time steps where the input intensity of the light illumination systems is reflected during the entire time. The integrated intensity of full "on" steps may then be supplemented by another time step where a partial value is written to the mirror element and thus the mirror has a duty cycle "On" level less then full on, for the remaining time steps that will be exposed to the reactive mixture as a whole, this particular voxel element could then be "off" for the remaining duration. An alternative methodology may include, taking the average value of intensity for the number of steps or "frames" that will be delivered and using that value to set the bulk of the frame values that are sent to the DMD. It may be clear to one in the art, that the generality of spatial light modulators discussed in the previous apparatus discussion, as well, have methodology embodiments to correlate with the intent of creating this intensity and time exposure control.

While the above described methods are given examples relating to modulating a fixed intensity applied to the spatial illumination device through the action of the spatial illumination device, more advanced methodologies may derive if the intensity from the light source is modulated either at the source or in the optic system with light filtration. Further embodiments may derive from the combination of intensity control both in the illumination system components and in the spatial illumination modulator. Still further embodiments may derive from the control of the wavelength of illumination.

The method of forming the "DMD" script, which from a general sense should be considered to relate to control signals to any spatial light modulator of any size and also to the control signals of any system component, as for example the light source, filter wheel and the like, may therefore, in general include creating a series of programmed command sequences in time. It may be obvious to one skilled in the art, that there are numerous embodiments relating to the method of creating a control signal program that encompass the many embodiments of the details of the actinic radiation, of the details of the optic system employed and of the details of materials comprising the Reactive Mixture.

It may be noticed that the details of a "DMD" script and the algorithms may have relationship to results obtained after processing. The feedback of critical parameters will be discussed later, and such detailed discussion is thus deferred. Nevertheless, in terms of the method of creation of a DMD script as shown in box 115, the double headed arrows pointing to and from the voxel based lithography methodology and feedback and metrology methodology refer in part to a role in this information exchange in the methods to create a DMD script.

Another input into the methodology of forming a Lens Precursor includes formulating and preparing a Reactive Mixture for the system. For example, chemical constituents acting as monomer units in the reactive mixture may include chemicals that are photoreactive to light in the ultraviolet spectrum, as has been described in some of the embodiments. However, unlike some other methodologies which do not consider the effects of the Beer-Lambert-Bouguer Law, Reactive Mixtures in the present invention include molecules which photoreactively absorb actinic radiation. Components within the system may likewise be tailored for consistency to another portion of the electromagnetic spectrum. Accordingly, molecules sensitive to actinic radiation across a large portion of the electromagnetic spectrum.

In some embodiments, Reactive Mixture includes one or more actinically reactive monomer types that are mixed with other chemical constituents. By way of non-limiting example, other chemicals may be included as absorbing compounds. Such an additive to the Reactive Mixture may be, for example, important in embodiments that operate the voxel-based lithography in such a manner that the intensity of the actinic radiation along a path defined by a voxel element may be modeled by the Beer-Lambert-Bouguer Law. One or more such components may largely define a thickness sensitivity of a formation process within a voxel element. In addition, some embodiments can include addition of a component to the Reactive Mixture that absorbs light within a relevant spectral region.

In other embodiments, an absorbing component of the Reactive Mixture may include additional complexity to that just discussed. For example, it is within the scope of some embodiments of the present invention an actinic radiation absorber component to include multiple molecules that absorb light in differing manners and/or wavelengths. Additional embodiments may derive from absorber elements comprised of molecules that have multiple, relevant, bands of absorption themselves. Still further embodiments of methodology may include adding components to the Reactive Mixture that have a combined monomer and absorber role. This combined role in turn may in some embodiments also allow for a continued absorbance role even after a monomer undergoes chemical reaction. Alternatively, additional embodiments may include chemicals added to a Reactive Mixture which have one or more properties of altered absorbance as actinic reactions occur. From a general perspective, it may be clear that many embodiments for the methodology of comprising a Reactive Mixture with a constituent to absorb radiation at one or more relevant spectral bands may be within the scope of the invention.

Additional embodiments may derive if addition of an inhibitor component is included into the method of preparing a Reactive Mixture. In this sense, an inhibitor compound would have a role in reacting with a chemical product that has formed in the Reactive Mixture. In some embodiments, absorption of actinic radiation may generate one or more free radical chemical species. An inhibitor may act in reacting with the free radical species, and thereby, end a path of polymerizing reactions. One effect of such an embodiment would be to limit the duration of a photochemical polymerization reaction, or in other ways limit the distance that a polymerization reaction may occur away from the original photoabsorption initiator event. It may be apparent that some embodiments of the addition of inhibitor to the Reactive Mixture, therefore, may have relevance on the spatial resolution that a collection of photons in a voxel element will ultimately reflect in the spatial localization of the reactions that they initiate. In general, the action of the inhibitor may include numerous embodiments relevant to the art.

The types of chemical species or components of the reactive mixture that may act in an inhibitory manner include numerous other embodiments of the art. As with the absorber, it is within the scope of the invention for an inhibitor to have dual roles, in inhibiting multiple polymerization pathways. Furthermore, an inhibitor may include a portion of a monomer molecule itself. An inhibitor may have a thermal or photoreactive sensitivity. Still other embodiments may derive from the nature of the inhibitor in its pure chemical state; as it may include a dissolved form in the mixture but exhibit gaseous, liquid or solid characteristics in its pure form.

The method of preparing a Reactive Mixture may have additional embodiments with respect to the addition of an initiator component. A Reactive Mixture may include a photoabsorptive component that in absorbing a photon generates a chemical species that precipitates a polymerization reaction. In some embodiments, an initiator may also include a molecule that absorbs significantly in a particular band. Further embodiments may occur with initiator molecules that are photoabsorptive in multiple relevant bands for the apparatus. Its absorption may include a relatively broad band of relevant frequencies as well. Still further embodiments are possible if the initiator component of the Reactive Mixture derives from chemical initiator reactivity residing one or more of the monomer molecule types in the Reactive Mixture as well.

Referring now again to FIG. 1, at 112, an amount of the Reactive Mixture may be does into a reservoir that may be accessed by a forming optic. In some embodiments, the reservoir will be an open container and in other embodiments, the reservoir can include a mold part suitable for mating with another mold part. Embodiments with multiple mold parts may resemble a cast molding system, however, unlike cast molding, the present invention will form at least a portion of one surface of a resulting Lens in a Free Form fashion that does not follow the curvature of at least one of the mold parts comprising the molding system.

In some embodiments, whether opened or closed, the Reactive Mixture contained in the reservoir can be equilibrated to have a desired concentration of dissolved oxygen or other gas. In some embodiments, the equilibration may be accomplished by storing a vessel containing a volume of Reactive Mixture in an enclosure with ambient atmosphere that includes a predetermined amount of oxygen (or other gas) present to equilibrate to the desired concentration when dissolved. Additional embodiments may include automated equipment that may exchange a correct amount of oxygen into a flowing Reactive Mixture via membrane technology. Other methods of incorporating dose the reactive mixture to a desired level of incorporated gas consistent with the scope of the invention.

In some embodiments, a volume of the dosed Reactive Mixture may now be transferred in a manual means into the reservoir comprising the vessel to contain the mixture in the proximity of the forming optic surface. Other embodiments may include automated mechanisms to fill the reservoir with the Reactive Mixture. Still further embodiments of the invention may include filling disposable vessels that may be used when needed for the lens forming process. The invention scope includes using a methodology of some kind to fill the reservoir in proximity of the forming optic surface with at least an amount of Reactive Mixture that is greater than the amount of material which will include a formed lens after all processing.

At 116 a Lens is formed. Generally, a Reactive Mixture includes an absorbing element such that there is a significant absorptive reduction of the intensity of actinic radiation directed into the Reactive Mixture based upon the depth that the imaged actinic radiation has passed through; as may in some embodiments be modeled with a Beer's law formalism.

In some embodiments, following the exposure of a volume of Reactive Mixture to a DMD script of actinic radiation, a forming optic through which the script was played will be removed from the remaining volume of Reactive Mixture. Some embodiments may include simply raising the forming optic from the reservoir of Reactive Mixture. In other embodiments, the reservoir may be lowered away from the forming optic. Various embodiments may also include the removal of a structure attached to the forming optic from the volume of Reactive Mixture. Structures may include, for example a Lens Precursor Form, a Lens Precursor or a Lens Still further embodiments may derive from automating either the lowering or raising step with equipment capable of controlling the rate of such removal with some precision. In alternative embodiments, the reservoir of Reactive Mixture may be drained in some manner resulting in separation of the forming optic with attached Lens Precursor Form from the Reactive Mixture.

The present invention provides apparatus and methods of forming an ophthalmic lens with multiple zones included in an optic zone. The multiple zones include one or both of optical characteristics provided by a change in refractive index and a shape of a lens area in the optic zone. In some embodiments, areas of different refractive index are spatially distributed within the optic zone to correspond with vision correction needs of a patient.

The present invention can utilize modulation of actinic radiation to create one or more areas of different refractive index based on differential curing and also modulate the actinic radiation according to photoabsorptive characteristics of a reactive mixture to form a surface with optical qualities. The invention, in a further aspect, provides a method of modulating or attenuating UV light to achieve differential curing of bulk reactive mixture material. Accordingly, some embodiments include two or more optical zones, wherein each optical zone may be formed by one or both of a different refractive index and a different optical curvature.

Unless defined otherwise, all technical and scientific terms used herein have the same meaning as commonly understood by one of ordinary skill in the art to which this invention belongs. Generally, the nomenclature used herein and the manufacturing procedures are well known and commonly employed in the art. Conventional methods are used for these procedures, such as those provided in the art and various general references. Where a term is provided in the singular, the inventors also contemplate the plural of that term.

A "crosslinkable and/or polymerizable material" refers to a material which can be polymerized and/or crosslinked by actinic radiation to obtain crosslinked and/or polymerized material which are biocompatible. Examples of actinic radiation are UV irradiation, ionized radiation (e.g. gamma ray or X-ray irradiation), microwave irradiation, and the like.

"Polymer" means a material formed by polymerizing one or more monomers.

A "prepolymer" refers to a starting polymer which can be polymerized and/or crosslinked upon actinic radiation to obtain a crosslinked polymer having a molecular weight much higher than the starting polymer.

The present invention is generally related to the manufacture and design of contact lenses. In one aspect, the present invention provides a method to produce a lens optical zone with a desired power by modulating an energy source to create varying light intensity according to an illumination scheme. According to the present invention, the illumination scheme may be combined with photoabsorptive characteristics of a Reactive Mixture. A varied light intensity may differentially cure the Reactive Mixture to create a spatial distribution of refractive indices in the optical zone of a lens within the cured lens. The intensity of the energy source, such as UV light, for example, is varied to manipulate the optical wavefront. The optical wavefront may be manipulated according to a specified pattern, such as a Zernike polynomial basis set or a presbyopic aberration pattern. The optical wavefront may be derived from the aberrometry data, corneal topography data or calculated as with a presbyopic correction wavefront.

Soft contact lenses of the invention are preferably made from a Reactive Mixture, such as a silicon or fluorine-containing hydrogel or HEMA with material properties that allow modulation of a refractive index. It will be understood that any Reactive Mixture can be used in the production of a contact lens of the invention. Preferred materials and formulations suitable for this application preferably consist of pure or specifically modified hydrogels; preferably polyvinylalcohols (PVA) containing radiation activated crosslinkable functional groups that may be photoinitiated when exposed to a particular wavelength.

According to some embodiments, ophthalmic lenses may be produced by double-sided molding (DSM) processes combined with freeform methodologies and apparatus which utilize photoabsorptive processes, such as those described herein related to Beer's Law.

The design of the lens may include creation of a zone or multiple zones within the material bulk within the lens geometry. The lens geometry may contain a single refractive index or multiple refractive indices in the optical zone of a lens, depending upon the type of correction needed. In general, most current lenses have a substantially uniform index of refraction.

The present invention provides for a lens with a spatial distribution of refractive index/indices. Additionally, the lens may include a zone with a varying index gradient. The index or indices of refraction, in combination with or in lieu of a surface geometry optical design preferably create the optical power of the lens. The location of these zones is determined by the desired optical design of the lens. The zone or zones with a constant or varying index gradient may be used to produce a single vision lens, a toric lens, a bifocal lens, a multifocal lens or any combination thereof.

The power of the lens is a function of the curvature of the anterior and posterior surfaces. Specifically, the power of the lens is measured in diopters, which may be considered as the reciprocal of the focal length of the lens.

In some embodiments, the surface of a lens may be changed to alter the focal length, which corrects vision; in addition, the present invention provides for the altering of a refractive index and the surface of the ophthalmic lens is fashioned to alter a focal length of light passing through the lens.

The present invention provides for an optical surface or shape which is a spherical surface or a non-spherical surface. A sphere may be centered on the optical axis. The "sag" or z-coordinate of a standard spherical surface is given by: Standard Spherical Surface $z=cr21+1-(1+k).times.c2.times.r2$ where [0055] c=curvature (reciprocal of the radius) [0056] r=radial coordinate in lens units [0057] k=conic constant; the conic constant is less than −1 for hyperbolas, −1 for parabolas, between −1 and 0 for ellipses, 0 for spheres, and greater than 0 for oblate ellipsoids.

Some lens designs included in the present invention may cancel or correct optical aberrations and defocus. Two basic methods for correcting defocus involve designing a lens surface profile or by changing the index or indices of refraction by the cure. The present invention provides for spatially distributing an index or indices of refraction in an optical zone of a lens to compensate for defects and design of a lens surface together in one lens. A lens design may be pre-designed as a generic lens or can be specially designed for a user. In a specific embodiment in which an ophthalmic lens is designed for the user, an ophthalmic wavefront sensor may be used to measure the irregularities on the eye, such as for example, a Shack-Hartmann wavefront sensor.

Starting at the retina, an ideal wavefront is generated, which passes through the optical path of the eye. The wavefront sensor illuminates the fovea with a narrow-beam light source, typically a laser diode or an LED, and records the position of the scattered light through a lenslet array. As the wavefront (the optical wavefront of the electromagnetic wave from the optical element) exits the eye, it contains a complete map of the eye's aberrations for analysis by the sensor. The lenslet array breaks up the nearly collimated beam into points on a digital camera, typically a CCD or a CMOS imager. Once the wavefront is received by the sensor, a complex series of analyses may be performed to provide a more complete picture of the eye's optical path. The data may then be fit to a Zernike basis set.

After the optical and mechanical design for a contact lens is completed, a lens design is preferably in a neutral file format, for example, such as IGES or VDA, or in a proprietary file format. After the known defects are fit into a Zernike or similar mathematical representation, the mathematical representation is converted into optical power.

In a preferred embodiment of the present invention, the Reactive Mixture, such as a hydrogel, will cure to produce a spatial distribution of refractive indices. This spatial distribution is preferably created in a pattern equivalent to the light intensity and illumination scheme. The difference in the index of refraction is proportional to the irradiance distribution and thus inversely proportional to the optical density (OD). The greater the index of refraction of the material, the greater the power difference in various optical zones of the lens. As stated previously, to provide vision correction, the index of refraction over the pupil must be uniform. By changing the refractive index of the lens in specific known areas of the lens to compensate for known deficiencies found in the uncorrected eye, the index of refraction can be normalized.

In some embodiments of the present invention, a modulating energy source may be provided via a gray scale mask. A gray scale mask, the mask may include a varying OD that controls the intensity of the UV light or other energy source into the mold, forming different indices of refraction or index of refraction gradients. In some embodiments, using a gray scale mask, the mask may be made using stereo lithographic techniques allowing a high degree of precision within the mask design. The design of the mask and the ability of certain parts of the mask to allow more or less penetration of the light energy may be a function of the design and fabrication process. The design of the mask preferably corresponds to the desired design of the lens in question, where the desired index of refraction imparted in the material is dependant on the amount of light energy the mask allows to penetrate into the lens mold cavity. The mask may also be affected by the light intensity.

In some embodiments, a material modification may include a material formulation based on a PVA formulation. A second material formulation preferably contains refractive index enhancing modifiers chemically attached to the hydrogel backbone that may be substituted benzaldehydes reacted with hydroxy groups of the PVA to cyclic acetals. The introduction of aromatic moieties into the polymer matrix may be used to increase an overall refractive index of the matrix, which leads to increased refractive index differences between areas of different polymer densities.

Additional increase of refractive index differences may be encouraged by aromat/polymer interactions, which enhance the packing order of the polymer chains in high-density areas as well as achieving higher efficiencies. Because the modifiers are chemically bond to the polymer matrix, the material remains biocompatible, without requiring additional extraction steps after the lens production.

In another preferred embodiment, a crosslinkable and/or polymerizable fluid material is an aqueous solution of one or more prepolymers and optionally one or more vinylic monomers, wherein the aqueous solution includes low molecular weight additives, such as NaCl, which exhibit a limited compatibility with a polymer resulted from the crosslinkable and/or polymerizable fluid material, but good compatibility with water. By virtue of the limited compatibility, the additive causes an osmotic gradient, which induces a contraction of a resulting polymer matrix.

Figure 2:
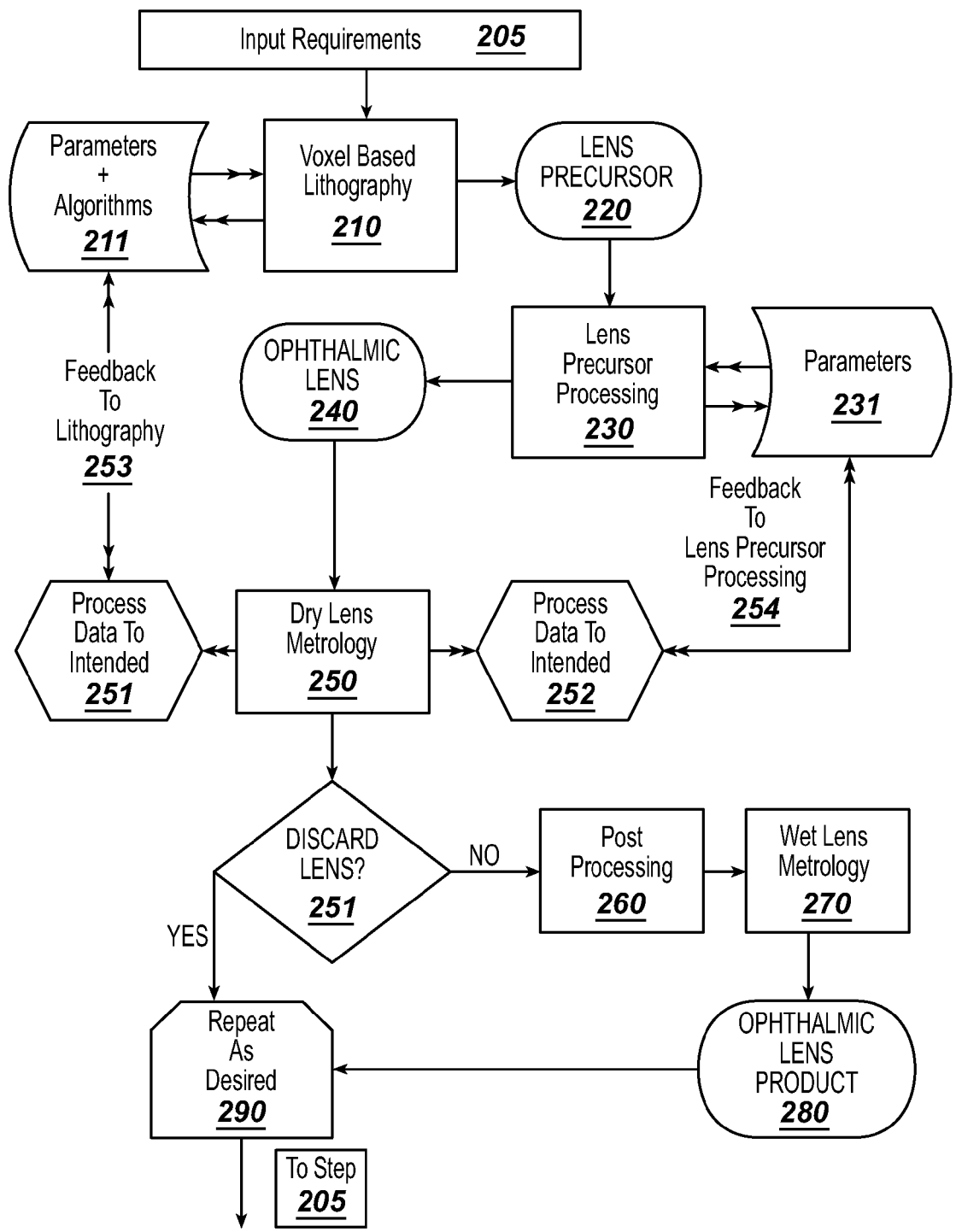
FIG. 2 illustrates additionally method steps that may be used to implement some embodiments of the present invention.

Referring now to FIG. 2. in another aspect of some embodiments of the present invention, formation of an ophthalmic lens may be enhanced via metrology and feedback. It should be noted that the steps shown in FIG. 2 and the description of related methodology are exemplary and are not meant to limit the scope of invention. For example, at 205 one or more desired lens parameters may be input from an external source. For exemplary purposes, the model of the lens surface may come from an ocular measurement device applied to a patient's eye. In other embodiments, theoretical input parameters may include the methodology of step 205. Such inputs will be processed in some methodology to align them with the input requirements of the voxel based lithography 210. The various apparatus receive such input and, in some embodiments, with an algorithmic method, convert the inputs to useable parameters in the voxel based lithography system 211.

Proceeding further in FIG. 2, a Lens Precursor may be formed on a voxel by voxel basis 220. A Lens and/or Lens Precursor may subsequently be processed with the Lens Precursor processing methodology 230 to fashion a "dry" form of an ophthalmic Lens 240. A dry ophthalmic Lens may now be measured in a metrology step 250. For exemplary purposes, this step may include use of a laser displacement sensor.

Algorithms may process this data, as depicted in items 251 and 252 to compare the result to what would be expected if the lens matched the input parameters from step 205. In some embodiments, differences from the input parameters may be processed and correspond with a need to change the parameters used to process the lens in the voxel based lithography system 211. This feedback loop of data and parametric information is depicted in the feedback loop of item 253. The data may also be processed and correspond to parameter changes desired in the Lens Precursor processing methodology 252. Feedback of desired changes to parameters in this system 252 is depicted by the feedback loop 254. It may be apparent that the various computational and control methodology may be performed on various data processing equipment including but not limited to mainframes, personal computers, industrial computers and other similar computational environments.

The results of the metrology step 250, and the various processing of the data 251 and 252, in some embodiments may include the ability to decide whether the produced lens 240, is within a set of acceptable limits around the input parameters of item 205. A decision on this Lens is then shown in item 251 where the lens may be discarded for another lens to be produced with altered parameters. Alternatively, the Lens may be within acceptable limits and therefore proceed onto step 260 for processing in the post processing methodology and apparatus embodiments. After the lens is then swelled and released it may be subjected to another metrology methodology as shown in item 270. In some embodiments, the result of this metrology could have similar feedback embodiments as has been indicated for step 250 in this embodiment.

After an ophthalmic Lens product is realized 280, the processing flow may join the flow where the dry lens was rejected. Thereafter it is possible for the entire flow to loop back to step 205 in a step indicated by the condition return step of 290. It may be apparent to one skilled in the arts that there are numerous modifications, additions and alternatives in performing a metrology step on the various products of this invention and then devising a feedback loop that incorporates the measured results and adjusts the system parameters.

In some slightly different embodiments, an additional type of measurement may gauge the quality aspects of the lens for global equipment feedback. As a non-limiting example, a particulate detection scheme may be deployed in some embodiments to measure the presence of such defects in the produced Lens Precursor. If such a measurement gave a result flagging a particulate issue, there could be a feedback loop that might in some embodiments involve feedback to an operator of the apparatus and methodology to remedy the issue flagged. It may be obvious to one skilled in the art that numerous metrology embodiments may include art within the scope of this invention where a measurement result is feedback to an operator.

Figure 3:
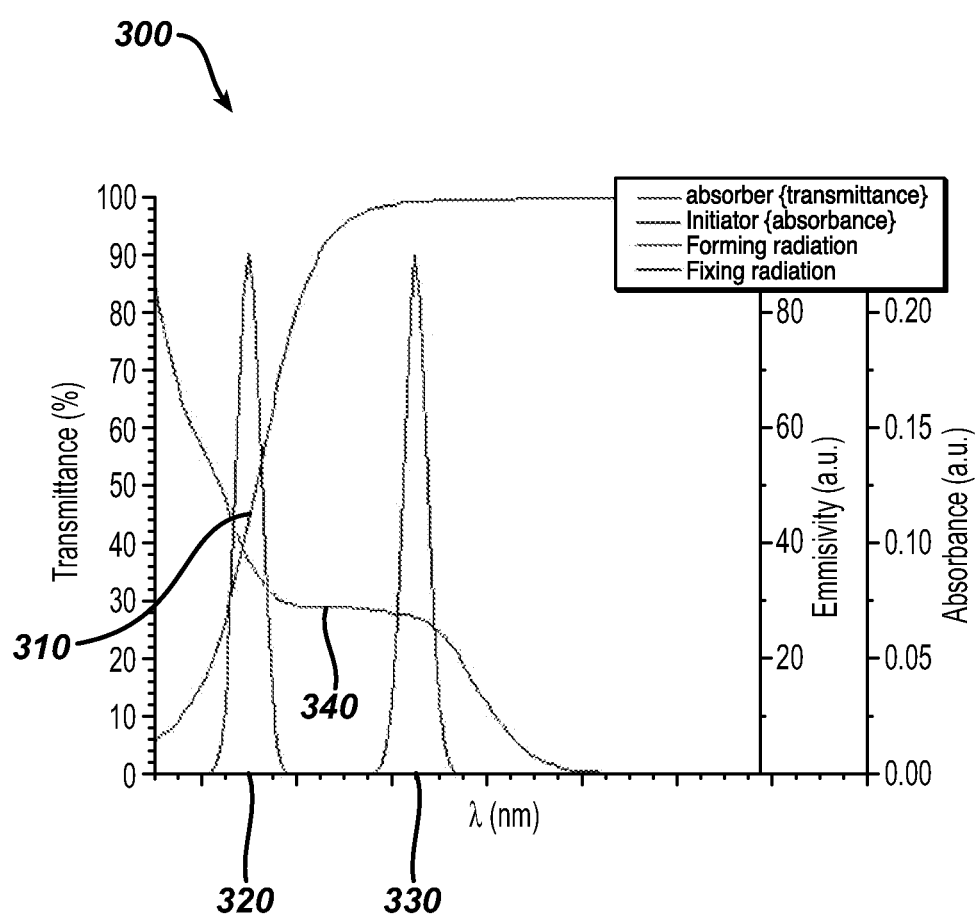
FIG. 3 illustrates an example of the relationship among absorbance and transmittance with forming and fixing radiation.

Referring now to FIG. 3, a chart 300 illustrates the relationship between transmittance of radiation frequencies and absorbance of radiation in an exemplary Reactive Mixture including Etafilcon A, a Reactive Mixture having general use in the production of ophthalmic lenses. Etafilcon A includes a monomer component that under polymerization is capable of forming one or both of solids and gels. Etafilcon A also includes an absorber molecule, Norbloc, which absorbs UV radiation in a band comprising the lower wavelengths. The forming radiation 320 is shown as a frequency band and the fixing radiation 330 is also shown as a frequency band. An initiator absorbance is shown as a step 340, and the absorber 310 is shown to plateau. In the Etafilcon mixture illustrated, the presence of dissolved gaseous oxygen includes an inhibitor role. Therefore, a Reactive Mixture can include both a formulation of a mixture of one or both of solid and liquid components and further includes controlling a level of dissolved oxygen. The description of this embodiment is exemplary, and, therefore it is not meant to limit the scope of invention.

In the methodology of the preparation of the Reactive Mixture, additional embodiments may be defined from treatments performed on the nascent mixture. By way of non-limiting example, the mixture may be subjected to an evacuated environment which may result in the desorption of certain dissolved gaseous species. In another embodiment, the Reactive Mixture may be treated by exposing the bulk mixture to an exposure of actinic radiation, thus altering the degree and population distribution of multimeric components in the mixture before it is used in a subsequent actinic processing step. It may be obvious to one skilled in the arts that numerous additional embodiments may be possible for the purpose of treating a Reactive Mixture to result in an altered characteristic; the resulting mixture being useful in the further purpose of producing ophthalmic Lens Precursors and lenses.

Exemplary radiation absorption is illustrated in a chart wherein the wavelength of the actinic irradiation directed upon a particular voxel element is such that it is in the actively absorbed wavelength region for the initiator included into the reactive mixture and is in a rapidly changing absorption region for the absorber. Also consider, by way of non-limiting example that the Reactive Mixture includes an inhibitor. Although this is presented by way of enabling embodiment, it is not meant to limit the scope of the invention and other models may be used.

At a microscopic level, the exemplary embodiment presented may have the characteristic that the incident actinic irradiation defines a very limited local region around itself where chemical reaction initiated by the actinic radiation in a particular element will occur at a rate that exceeds the ability of a highly concentrated inhibitor to inhibit its furtherance. Because of the fact that some spatial light modulator systems will have a portion of their surface between each individual modulating element as "dead" space, not reflecting the light in the same manner as the modulating element, it may be apparent that in this embodiment, the resulting material that is formed upon the forming optic surface may take the form of isolated voxel-based columnar elements, that in some embodiments may not connect with each other. Other embodiments can include overlapping voxels of crosslinked material.

Control of a DMD or other device used to direct rays of actinic radiation towards a forming optic may be used to affect the spacing of polymerized voxels and therefore the incidence of overlap or separateness between the polymerized voxels.

In addition, in some embodiments, an inhibitor concentration may affect spatial propagation for a given set of actinic illumination parameters. Accordingly, in some embodiments, voxel elements will define actinic activity that proceeds to overlap any border between voxel elements. In such a case on a microscopic basis, the individual columnar elements may tend to blend into each other for illumination conditions where neighboring voxels define significant intensity conditions. In some embodiments, an optical imaging system may be run in a mode where it is de-focused as another method embodiment to drive the individual columnar elements to blend together. In still further embodiments, a vibrational or wobble movement of the forming lens optic and holder in space may drive a similar effect where the voxel elements will overlap each other forming a continuous form piece.

In another aspect of the present invention, a particular voxel element's "DMD script" may define an integrated intensity or exposure time which causes reaction to occur into the depth of the voxel element away from the forming optic surface. At some particular exemplary depth this condition may include an intensity driven reaction condition in the Reactive Mixture where the degree of reaction defines a gel point.

At depths that are less then this depth the reaction product may have formed a three dimensional aspect; however at depths greater than this depth, the reaction product may not have reached the gel point and may still include a mixture of components that is more viscous that the surrounding nascent Reactive Mixture due to some level of monomer reaction that has occurred.

In such embodiments, sufficient volume of the nascent Reactive Mixture to may include regions where a reaction has occurred to a higher degree than the gel point, and a region where material includes a non-gelled layer which may be a mixture of partially reacted and unreacted Reactive Mixture. Under some embodiments, some of this layer may include what is called fluent lens reactive media. At a microscopic level it is being formed within the volume space of the reactive mixture, but not necessarily to an entire volume between two mold parts.

In other embodiments, the "DMD script" may be useful to define local design elements into the voxel defined layer that has reacted past the gel point. This entity may be considered a Lens Precursor Form in some embodiments. By way of a non-limiting example, consider the effect of embedding an essentially linear feature into the DMD Script which is a number of voxel elements wide and many voxel elements in length and has the property of low integrated intensity for all voxel elements it includes. Using the embodiments discussed for Example 3, by way of non-limiting example, it may be envisioned that such a linear feature would be defined physically into the Lens Precursor Form. At the microscopic scale, neighboring voxel elements may include intensity to define their thickness in the Lens Precursor Form at some significant level. At the first neighboring voxel element of the linear feature, the form thickness will drop resulting in a profile feature related to the linear feature defined in the DMD script.

Figure 4:
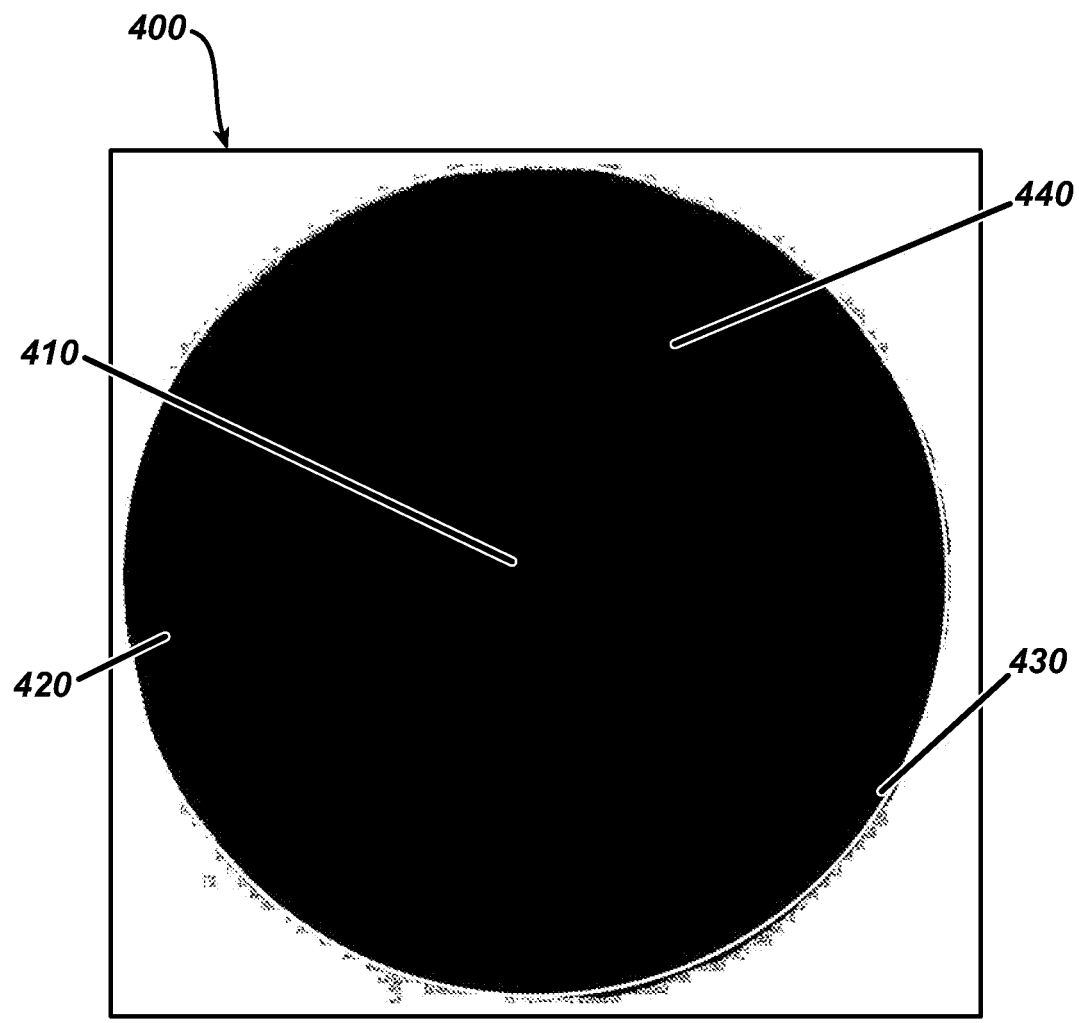
FIG. 4 illustrates an example of the lens produced with the invention herein disclosed.

Referring now to FIG. 4, a Lens 400 formed according to some embodiments of the present invention is illustrated. In this example, the Lens illustrates a linear feature 440 that extends for multiple voxel elements across a lens. It may be obvious by inference, that the aspects of the invention include many different embodiments of shapes and profile features that may be defined in addition to the optical surface definitions of a Lens. Amongst, the numerous embodiments possible, by way of example there may be alignment features, raised surface portions and surface portions in relief. Additional embodiments may include one or more profile features such as, for example: features that define drain channels; a linear feature extending along an essentially radial path toward the edge of the Lens Precursor Form; wells or bottomed holes in various shapes and sizes; abrupt steps up or down compared to the neighboring average topology; and plateaus or essentially flat features across a subset of the lens definition region. These examples are but a few of the numerous embodiments that may be apparent to one skilled in the art related to the forming step methodology.

Figure 5:
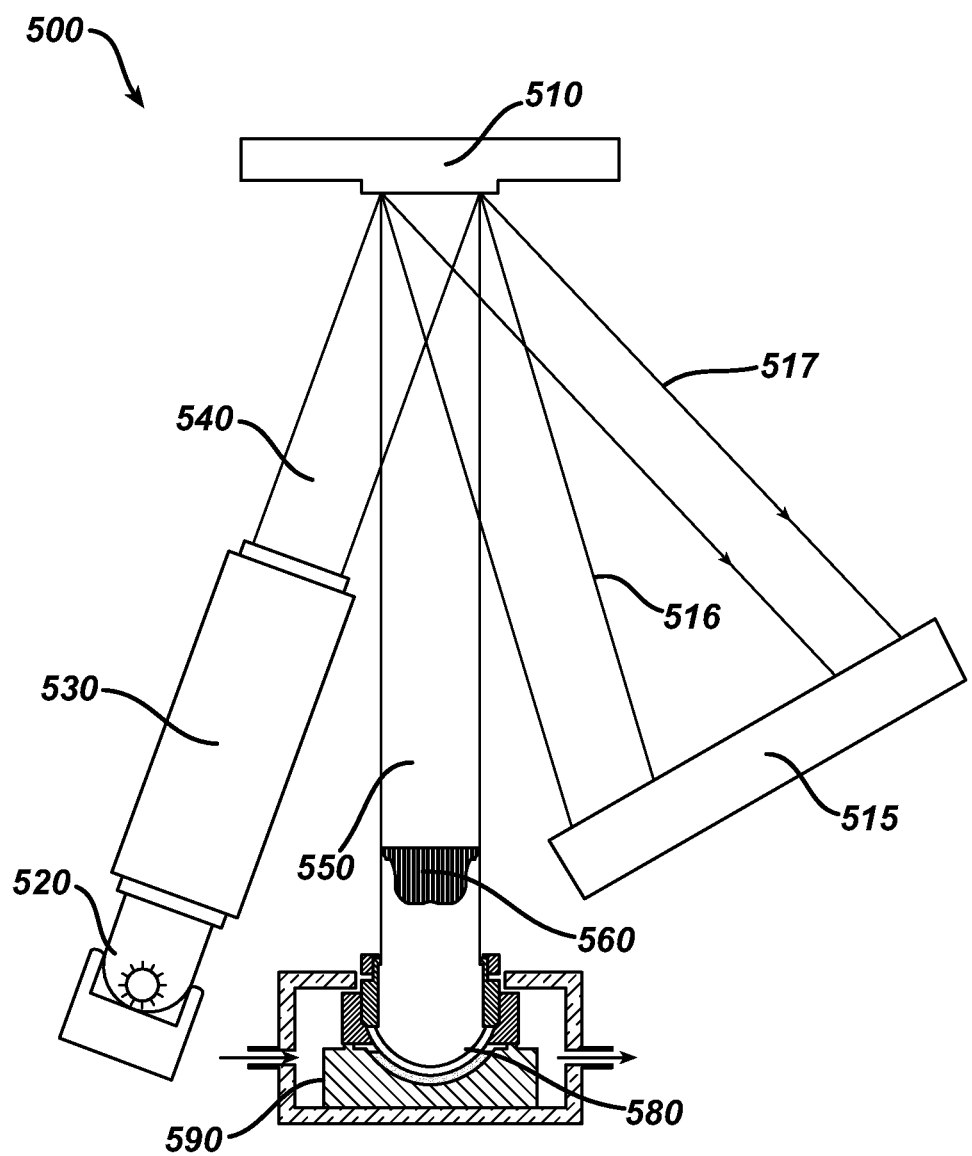
FIG. 5 illustrates apparatus components that may be useful in implementing some embodiments of the present invention comprising Voxel based lithography.

Referring now to FIG. 5, a Lens forming apparatus 500 includes a light source 520. Light generated by the light source 520 emerges as light in a defined band of wavelengths and spatial variation in intensity and direction. In some embodiments, the defined band of wavelengths includes actinic radiation for a Reactive Mixture used to form a lens.

A spatial intensity controller 530, or collimator, may be used to condense, diffuse and, in some embodiments, collimate light from the light source 320 to create a beam of light 540, which is highly uniform in intensity. Further, in some embodiments, the beam 540 impinges on a digital mirror device ("DMD") 510 which divides the beam into pixel elements of intensity each of which can be assigned a digital On or OFF value. The mirror at each pixel reflects light in one of two paths. An "ON" path, item 550, is the path that leads to photons proceeding toward a reactive chemical media.

Conversely, in some embodiments, an "OFF" state includes light being reflected along a different path that will lie between the paths depicted as items 516 and 517. An "OFF" path may be used to direct photons to impinge upon a beam dump 515 which functionally absorbs or otherwise entraps photons directed towards it.

Referring now again to the "ON" path 550, light depicted in the ON path may includes many different potential pixel values that have been set to an "ON" value and which are spatially directed along an individual path corresponding to a pixel location. A time averaged intensity of each of the pixel elements along their respective paths 550, can be represented as a spatial intensity profile 560, across the spatial grid defined by the DMD 510. Alternatively, with a constant intensity impinging each mirror, item 560 may represent a spatial time exposure profile.

Pixel elements in an ON state will have photons directed along their respective paths 550. In some embodiments, a light beam, or ray, may be focused by a focusing element. By way of example, light paths 550, may be imaged such that they impinge in a manner essentially normal or perpendicular to the surface manner upon the optic surface of a forming optic 580. Imaged light may proceed through a forming optic 580, and into a reservoir that contains reactive lens mixture 590.

The interaction of a light ray associated with a given pixel location defines an ON state Voxel element in the volume of reactive media or crosslinkable material contained the reservoir 590, and around the forming optic 580. Photons in this volume of reactive media may be absorbed and precipitate an actinic reaction in the molecule that absorbs it, leading to a polymerization state change of the monomer in the general vicinity of the molecule.

According to some embodiments of the present invention, Voxel based lithographic systems may be used to form an ophthalmic lens. A graphical representation of the wavefront surface of such a formed lens is illustrated in FIG. 4.

In some embodiments, an ambient environment, including temperature and humidity, encompassing apparatus 500 can be controlled. The nature of the ambient gaseous environment can be controlled, for example, through the use of purging nitrogen gas. Purging can be performed to increase or reduce oxygen partial pressure to predetermined levels. Humidity may also be maintained at relatively predetermined levels, such as at relatively lower levels than an office environment.

The level of vibrational energy that is allowed to interact with the individual apparatus components is another environmental parameter that may be controlled in some embodiments. In some embodiments, large massive support structures define a relative low vibrational environment. Other embodiments may include some or all of the Voxel-based lithographic system 500 to be supported upon active vibrational supports. Without limiting the generality of possible solution, it is well known in the art that air bladder support pistons can significantly reduce vibrational transfer into an isolated system. Other standard means of vibrational isolation may as well be consistent with the scope of the invention.

Particulates in the environment of the apparatus may introduce undesirable defect modes of various types including incorporation into the product Lens Precursors and lenses. For example, in the optic path, particulates can modulate the actual intensity of one or more Voxel elements and or affect the function of a particular mirror element. For these reasons, at a minimum, it is entirely within the scope of the invention to provide a means of controlling particulate matter in the environment. One example of an embodiment to achieve this would be the incorporation of high efficiency particulate air (HEPA) filters into the body of the apparatus environment and a means of forcing air through the filters sufficient to establish a laminar flow regime in exposed portions of the apparatus. Nevertheless, any embodiment to significantly limit particulate levels in and around the apparatus is within the intended scope of the invention.

Another aspect of the detailed environmental support for optical apparatus according to the present invention, includes the ambient light and manners to control it. In some embodiments, ambient lighting provides actinic radiation and it is therefore prudent to limit stray sources of photon energy.

Accordingly, in some embodiments, apparatus 500 can be enclosed in opaque materials consistent with the previously discussed environmental needs. A preferred embodiment may employ the use of filtered light sources in the environment of the apparatus, which may be sufficient to avoid exposure of active portions of the apparatus to contaminating environmental lighting.

Figure 6:
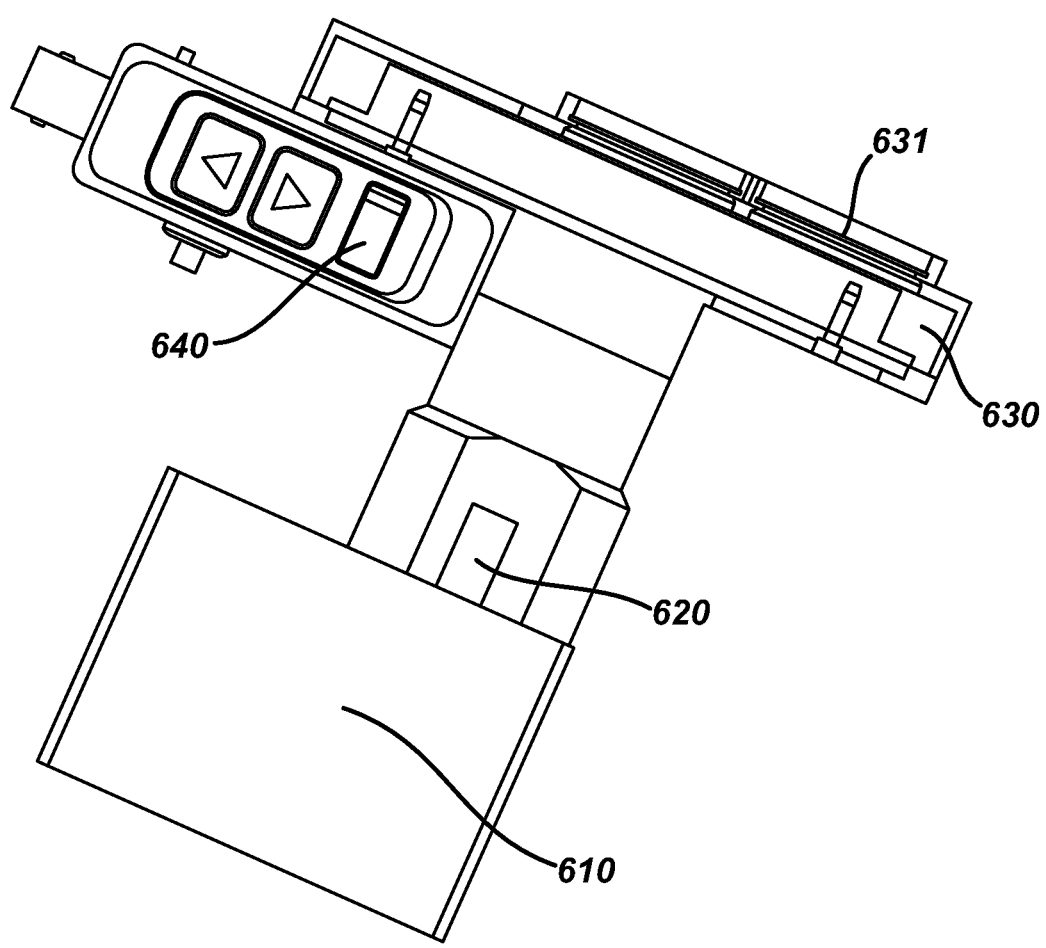
FIG. 6 illustrates exemplary light source apparatus components that may be useful in implementing some embodiments of the present invention.

Referring now to FIG. 6, consider the light source as depicted in a highlighted form 600. Specific aspects of light energy can be considered a fundamental aspect of any lithographic system and in embodiments of this invention which use the Voxel-based lithographic optical apparatus, the nature of the source of light for the system may be important.

In some embodiments it is desirable for a light source 620 to provide light in a narrow spectral band. The components of an exemplary light system 600, provide the means of accomplishing said narrow spectral character. In a preferred embodiment, a light source includes a light emitting diode 620, which exists in an environmental support and enclosure 610. For exemplary purposes, in some embodiments a light emitting diode source 620 can include the model AccuCure ULM-2-365 light source with controller from Digital Light Lab Inc. (Knoxville, Tenn. USA) This model emits a narrow band of light centered around 365 nm and further having the characteristics of a full width at half maximum breadth of approximately 9 nm. Thus, this commercially available light source component already emits light in a desirable narrow band without further apparatus. It may be clear that any LED or other light emitting product with similar characteristics may also be utilized.

Alternatively, wider spectrum light sources, such as, for example carbon arc lamps or Xenon lamps 620 may also be used. In this alternative, a broad band source can be utilized 620. Light emits out of the environmental container 610 and proceeds through a filter wheel 630 deployed on the light source 620. The filter wheel 630, can contain multiple, distinct filters 631, at different operational locations and these filters 631, may, for example, include a band pass filter that will transmit light centered at 365 nm with a full width at half maximum breadth of a similar 10 nm performance. In this embodiment, the filter wheel can be actuated by a motorized actuator 610 which can index the filter wheel to different filters; and therefore allow the exemplary Voxel-lithographic system embodiment 500 to operate at multiple selectable wavelengths.

It may be clear that numerous alternative embodiments may easily derive, including in a non-limiting perspective, the fact that the filter 631 may be mounted in a fixed manner proximate to the wide band light source 620 and provide an appropriate embodiment. In another aspect, a multiple wavelength capability may be derived from an alternative embodiment where there are multiple LED light sources 620, in the environment 610 that are activated individually for a different wavelength.

More generally, it should be apparent that some embodiments may include various light sources, including, for example, incandescent, laser, light emitting and other analogous products with or without filters of various kinds. Additionally, in some embodiments, light sources can be capable of emitting light in a controlled spectral band can be utilized and are within the scope of this invention.

The light source 600, additionally may have the characteristic of being stable, uniform and relatively intense. In the some preferred embodiments, an AccuCure LED light source 620, outputs intense light and includes an internal monitoring feedback loop to maintain a stable intensity over time periods.

A light source 620, can include means for modulating the intensity in a controlled manner; including modulating the source on and off with a defined duty cycle. Thus, over an integrated period of time, this mode of intensity control will result in selectable time averaged intensity levels. Alternatively, in an additional operational embodiment, the LED source can modulate intensity via a voltage controlled operational mode where the change in intensity occurs for the time independent level of emitted intensity.

For stability of the output of any light source component 620 additional features in the environment of the light source may include additional embodiment definitions. Examples of this aspect could include temperature control means via cooling systems. Other environmental controls may include different embodiment definitions consistent with the intent of this invention.

In a different aspect, the light source apparatus 600, provides an alternative embodiment for intensity modulation. The individual light source 620 may be operated to emit a given intensity and the filter wheel 630 may be actuated by a motorized element 610, to intercept the emitted light with a neutral density filter 631. Thus, the intensity of light provided to the rest of the Voxel-lithographic system 500 will be modulated to a lower intensity. From a generality perspective, it may be noted that the design of the individual light filters 631 may involve numerous degrees of freedom and in their own right include different embodiment aspects. By way of a non-limiting example, a filter may be designed to modulate intensity in a spatially defined manner such that it defines higher intensity along one path through its body than in another path. In a second non-limiting example, a filter wheel may be designed to modulate intensity in a manner such that it is synchronized with operation of the DMD, thereby allowing coordination of pixels and intensities defined by the density values of each filter wheel segment. Combinations of these operational modes provide alternative embodiments, and it should also be clear that any means of controlling light intensity of the characteristics thus described is within the scope of the invention.

In some embodiments, a filter wheel 630 can shutter a filter element 631 so that it blocks irradiation from the rest of the optic system 500. There may be numerous advantages to incorporating such a function including the stability and longevity of downstream optic components. Additionally, in some embodiments, the stability of a light source component 620 may be improved if it is allowed to continuously operate. A blocking filter 631, may allow for means of performing steps in the rest of the operational system that require the absence of the light from the light source 600. While a particular location of the filter wheel 630 has been described, embodiments may include other appropriate locations along the optic path.

In another aspect, in some embodiments, a Voxel-based lithography optical apparatus may include a homogenizing and/or collimating optic. This apparatus is designed to take the light output of the light source 520 and produce output radiation 540 that is of more uniform intensity and is focused upon the DMD 510.

Figure 7:
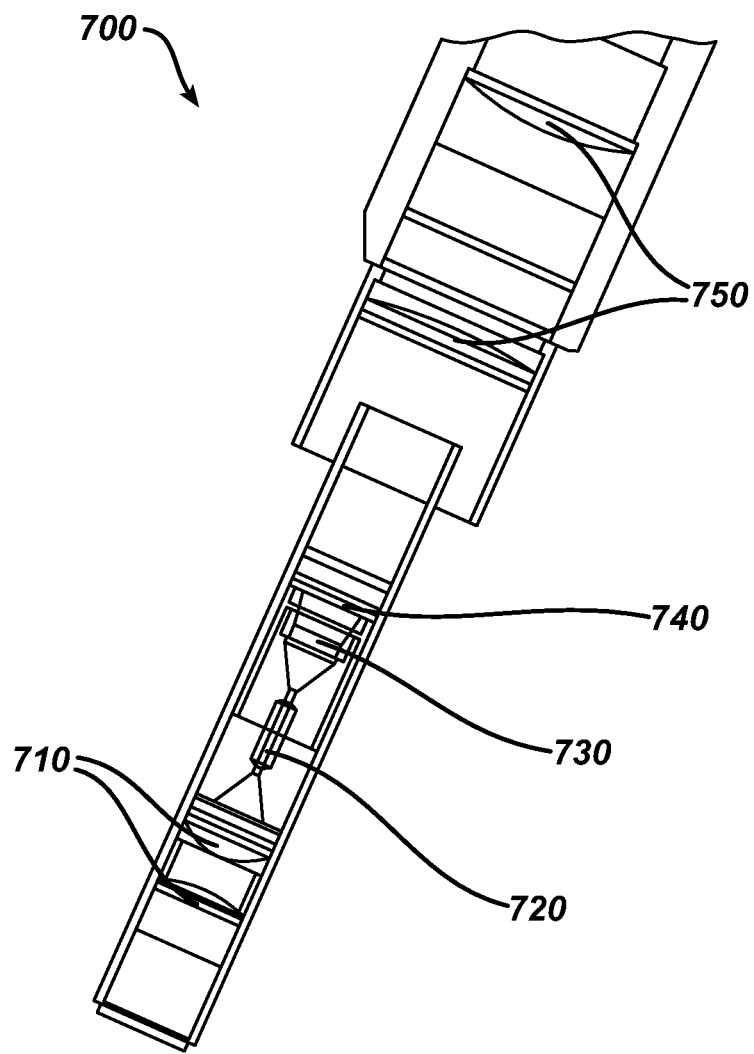
FIG. 7 illustrates exemplary optical apparatus components that may be useful in implementing some embodiments of the present invention.

Referring now to FIG. 7. some preferred embodiments are depicted. As described above the apparatus may collimate the light from the light source 520 and may also homogenize that light relative to intensity. Some specific embodiments include an AccuCure 365 nm LED light source 620, attached to optical components to perform collimation of the light source 620 output.

Collimating apparatus may include a collimation component and a homogenization component. In the preferred embodiment, light is collimated sufficiently by the light source 620 to proceed into 700 and impinge a set of roughly 1 inch focusing optics 710. The optics 710 may include lens components available for example from CVI Laser, Inc, (Albuquerque, N. Mex. USA).

One or more lenses 710 may be utilized to focus source light onto a light pipe 720. The light pipe 720 is functional to homogenize the input light and smooth out nonuniformities in the spatial intensity. The light pipe 720 may include a hexagonal shaped optic pipe made of UV grade acrylic material. Alternative embodiments can include optical apparatus for homogenizing the source light spatial uniformity.

The homogenized light output from the light pipe 720, is focused by an off the shelf grade optic element 730 again of the type available from CVI Laser Inc. (Albuquerque, N. Mex. USA) for example. The focused light now proceeds through an aperture stop 740, on to a set of roughly 2 inch focusing elements 750. Again these focusing elements are standard, off the shelf grade optics as may be available through Thorlabs Inc. (Newton N.J. USA), by way of example. The intent of the focusing optics 750, now is to direct the light to a focal location at the digital mirror device (DMD) 510. This completes the path of light in the illumination section of Voxel-based lithographic system. There may be numerous embodiments that may alter aspects of the collimator and homogenizer components to achieve a similar aim in illuminating the DMD 510 with intense, uniform light of a desired central wavelength and spectral bandwidth, which are within the scope of the invention.

Figure 8:
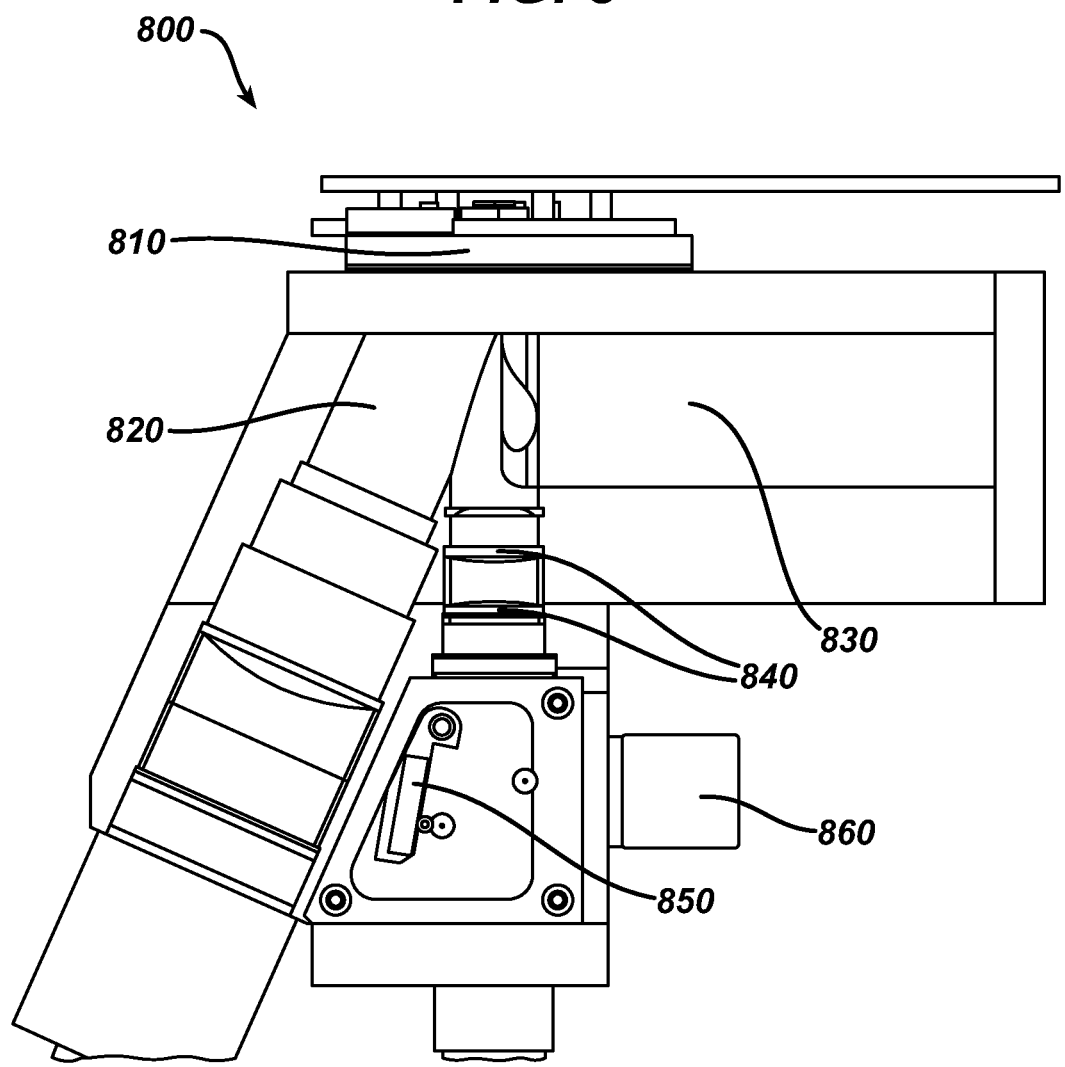
FIG. 8 illustrates exemplary digital mirror apparatus components that may be useful in implementing some embodiments of the present invention.

In the preferred embodiment, the illumination system items 520 and 530 impart light, (identified as 820 in FIG. 8 800) onto and just around the active elements comprising a Texas Instruments Digital Mirror Device 510. The DMD used in the preferred embodiment was obtained with a DMD Developer Kit: DMD Discovery 3000 available from DLi (Digital Light Innovations, Austin Tex., USA). The kit contains A DLi DMD Discovery 3000 board with a Texas Instruments DLP™ XGA DMD chip (768×1024 mirrors) 0.7" diagonal with UV transmissive window option. Also included is an ALP-3 High Speed light Processing board married to the D3000 board to act as a link from a computer to the D3000. Together these components include 810 in FIG. 8 800 of the imaging system components from this preferred embodiment of the Voxel based lithography system. A detailed description of the TI DLP™ XGA DMD may be obtained from TI as the DMD Discovery™ 3000 Digital Controller (DDC3000) Starter Kit Technical Reference Manual.

The DMD device 810 can function to provide spatial modulation in the intensity of light that exits from the illumination system. The DMD from Texas Instruments performs this function in a digital manner by reflecting light off of the micromirror components that make up a single addressable location in the spatial grid of the active area of the device. Therefore, the intensity of light that gets reflected from the DMD 810 and further down the imaging system 800, per se, is not changed however by controlling the duty cycle of the mirrors into an on state or an off state, the time averaged intensity that is reflected from a single pixel location can be modified.

In other embodiments, a Spatial Light Modulator (SLM) such as those available from Fraunhofer Institut Photonische Microsysteme of Germany can be used to control radiation on a Voxel by Voxel basis and can include the spatial modulation in intensity function 810. The mirror-like surface of the SLM may actually be composed of multiple (i.e. thousands) of tiny moveable mirrors, each mirror with its own storage cell within the integrated circuit. As the image of the desired intensity profile is sent to the SLM, individual mirrors are either flexed or remain flat (unlike the TI DMD which rotates or tilts the micromirrors). Light reflected off the flexed mirrors is scattered such that it does not pass through and expose the actinically reactive chemical mixture.

Referring now again to FIG. 8, as mentioned above, the active imaging element DMD 810 processes light in a digital manner reflecting it in one of two directions. In the off state, the path of reflection of the light is intended not to ever see the location with the actinically reactive chemical mixture. To ensure, that light directed in the off direction does not ever see this path, part of an imaging system 800 can include a light dump 830. This dump is included of highly absorptive surfaces that absorb significantly any light incident upon them and reflect only into further depths of the dump itself. In the preferred embodiment, as a non-limiting example, these surfaces include absorptive ND glass sheets as that which can be obtained from Hoya Inc. (Tokyo, Japan).

Light that is reflected from mirror elements in the "on" position takes a different path and heads towards focusing elements 840. As with the other optics these roughly 1 inch focusing lenses are off the shelf components that may for example be available from Thorlabs Inc. (Newton N.J. USA).

These focusing lenses 840 focus the "on" state light emanating from the DMD 810 as an object onto the forming optic where the reaction of light with reactive monomer mixture occurs.

In some embodiments, it is desirable to provide a means of imaging and monitoring the status of the optic path directly, rather than inferring from results on lenses produced. In the preferred embodiment of the Voxel-based lithography optical apparatus, provision is provided for this direct monitoring. Light that would be focused onto the forming optic 580, is intercepted with a mirror 850 that can be switched into and out of the beam path. The light that is so directed is then incident on a photo-detective imaging apparatus 860.

Figure 9:
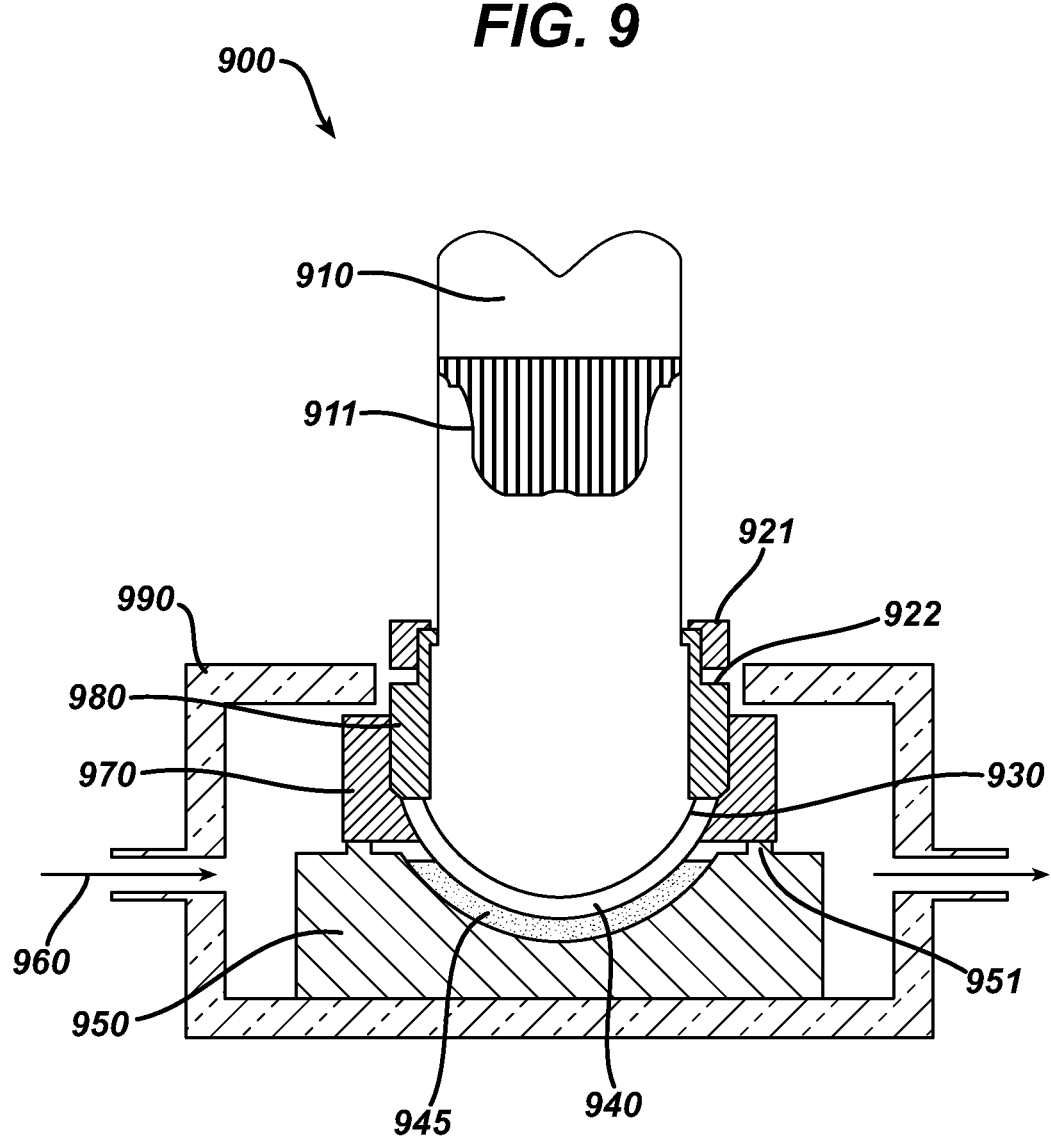
FIG. 9 illustrates additional apparatus components that may be useful in implementing some embodiments of the present invention.

Referring now to FIG. 9, the components of the forming apparatus 900 impinge the beam on the ultimate target area of the Reactive Mixture. As mentioned above, in some embodiments, this light has been focused onto a normal orientation with the surface of the forming optic 930, itself. In the embodiment illustrated 900, the light may impinge in a roughly vertical manner to the surface of the forming optic 930. In alternative embodiments, a lens can be held in place via a retaining ring or other fastening device, demonstrated as 921, which may maintain the correct orientation of said lens relative to the forming optic 930. From a broad perspective it should be noted that the invention includes numerous embodiments related to the path light will take on a Voxel by Voxel basis across the optic surface 930.

Continuing with FIG. 9, since the relative orientation of the reservoir and forming optic to the light beam is of importance, mechanism for their interlocked location may be defined in some embodiments as demonstrated by the interaction of items a forming optic retaining member 970, and the reservoir for containing the reactive monomer mixture 950. The alignment between these two members will also provide for positive control of the centering of the reservoir 950, to the forming optic surface 930. The position control may also be enhanced in some embodiments with the function of spacing ring 951. This spacing likewise will control the volume of reactive monomer mixture that may be added to the reservoir 950.

FIG. 9 also shows an additional embodiment aspect relating to the control of ambient gasses in the neighborhood of the reactive monomer mixture. Since in some embodiments, the presence of oxygen can modify the photochemistry of the monomers and acts as a scavenger of photogenerated free radicals, in some embodiments it needs to be excluded from the gas surrounding the reservoir 950. This is accomplished in FIG. 9 900 by the containment vessel 990. By flowing an inert gas, such as nitrogen, through 960, oxygen may be excluded from the environment. In still another embodiment, the oxygen level may be maintained at a level by controlling its dilution in the gas 960, being flowed through the containment vessel 990. Standard means, through the use of gas mass flow controllers to achieve a constant dilution level of the oxygen in the gas 960 are well known art and include embodiments within the spirit of the invention.

The reservoir 950, which contains the Reactive Mixture, may be filled with an appropriate volume of said Reactive Mixture. In some embodiments, this filling could be performed before the forming optic 930, is positioned relative to the reservoir 950. In other embodiments, the forming optic 930 and the reservoir 950, may be placed inside a containment vessel 990 and subjected to the purging with a gas flow 960. Filtering of the Reactive Mixture prior to use may also be employed. Thereafter, a volume of the Reactive Mixture 945, may be quantitatively filled into the reservoir 950.

There may be numerous means to transfer the Reactive Mixture 945, including hand filling, quantitative fluid transfer by automatic means or filling until a level detector measures the appropriate level of Reactive Mixture 945 in the reservoir 950. From a general perspective it may be obvious to one skilled in the art, that numerous embodiments to transfer an appropriate amount of Reactive Mixture 945 may be practical, and such techniques are well within the scope of invention.

In embodiments where the level of oxygen is critical to the photoprocessing steps, it may be apparent that oxygen may be present as a dissolved species in the reactive monomer mixture 945. In such an embodiment, means to establish the oxygen concentration in the reactive monomer mixture 945 are required. Some embodiments to accomplish this function include allowing the mixture to dwell in the gaseous environment through which the purge gas 960, is flowing. Alternative embodiments may involve vacuum purging of the dissolved gasses in a supply of the monomer mixture and reconstituting a desired amount of oxygen during a dispensing of the mixture through membrane exchange of gas with the liquid to be dispensed. Within the scope of the invention, it should be apparent that any means to establish the needed dissolved gas at an appropriate concentration is acceptable. Furthermore, in a more general sense, other materials may act as appropriate inhibitors in the presence or absence of the dissolved oxygen. From an even more general perspective, embodiments that include apparatus to establish and maintain an appropriate level of inhibitor are anticipated in the scope of the invention.

Figure 10:
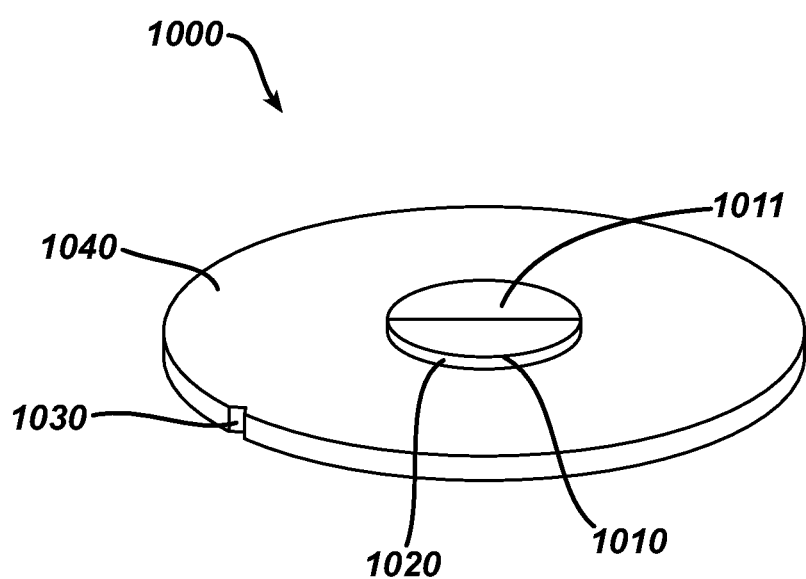
FIG. 10 illustrates an exemplary forming optic that may be useful in implementing some embodiments of the present invention.

Referring now again to FIG. 10, an exemplary shape of a forming optic and its holding and locating apparatus 1000 is illustrated. The structure that holds the forming optic can include flat glass disk 1040. The forming optic can be located and fastened by means of an optically consistent adhesive 1020 using an assembly jig to ensure alignment between the disk and the forming optic. The disk's flat surface provides positive orientation in the vertical direction, while a locating notch 1030 and other flat surfaces not illustrated can allow for radial and horizontal positional control.

Figure 11:
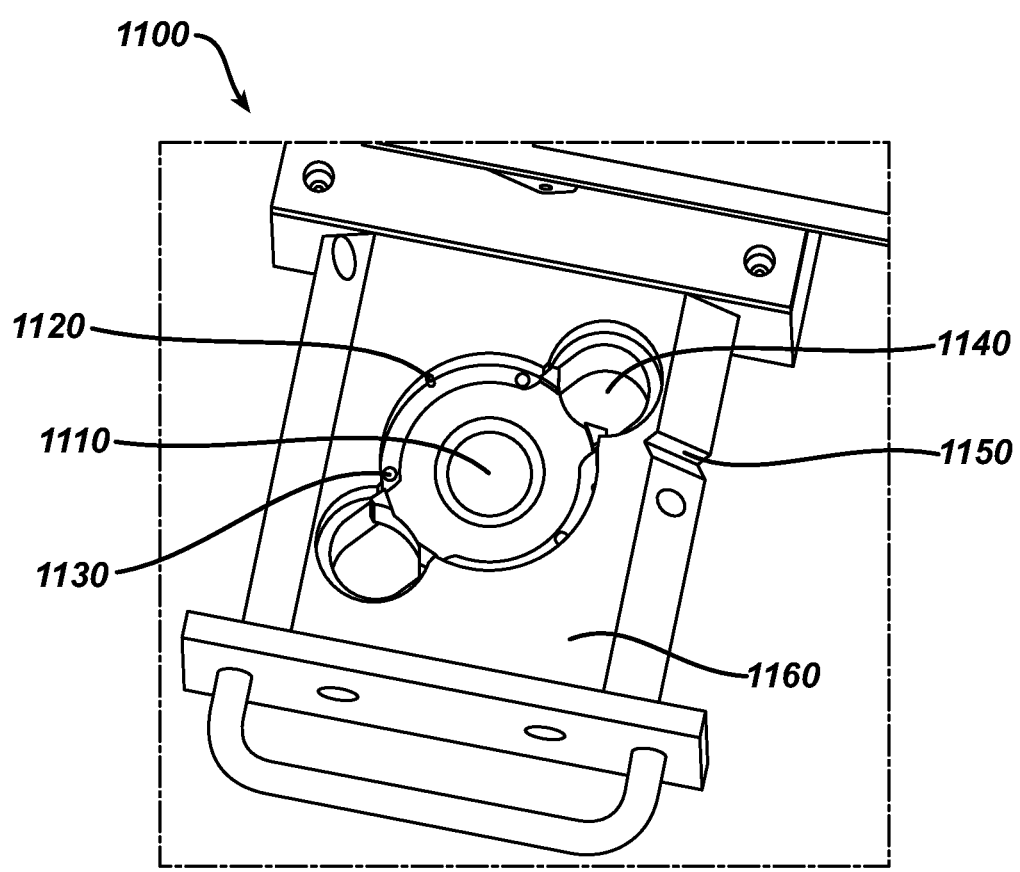
FIG. 11 illustrates an exemplary monomer reservoir that may be useful in implementing some embodiments of the present invention.

Referring now to FIG. 11, the disk 1000, mates with the reservoir system 1100. The flat surfaces sit upon three mating surfaces 1130. Some embodiments may additionally include a spring loaded locating pin 1120 which positively mates and locates to item 1030. Two static locating pins (not illustrated) engage two other flat surfaces on the forming optic assembly and the combination acts to kinematically locate the forming optic assembly, in all degrees of freedom, thus ensuring a repeatable and stable means of locating the forming optic in the optical light path. In some embodiments, a reservoir for containment of the reactive monomer 1110 can also be included. From a more general perspective, there are numerous embodiments, consistent with the inventive art disclosed herein, that may be obvious to one skilled in the art for ways to center a forming optic, to locate such optic in proximity to a reservoir which will contain Reactive Mixture and to locate one or more such functions in an ambient controlled environment.

The forming optic 1010 is at least partially transmissive to a desired spectrum of actinic radiation. Accordingly, in various embodiments, forming optic 1010, may include, by way of example, one or more of: quartz, plastic, glass, or other material transmissive of light wavelengths operative to cure a reactive monomer mixture used. It may further be noted that the shape of the forming optic 1010 includes one of the surfaces 1011 with characteristics to be imparted into a lens or Lens Precursor, formed along the surface 1011 via polymerization resulting from the forming actinic radiation that passes through the forming optic 1010. Numerous shape embodiments may include the inventive art herein.

Within the various embodiments that may be employed for the design and characteristics of a forming optic 1010, individual examples of said pieces may have unique aspects related, for example, to its stock material, manufacturing, history of usage and/or other causes. These aspects may or may not interact with the overall function of the Voxel lithographic system 500, creating unique optical offsets for the Voxel by Voxel intensity profile required to achieve an end product aim. Therefore, some embodiments may employ means to condition forming optics 1010, maintain them and track them. By reason of example, one embodiment may be to encode an identification mark in machine readable format on the flat surface of a forming optic piece 1040. Additional embodiments could include, for example, the attachment of an RF identification device along with said identification mark for machine readability. There may be numerous other embodiments to identify individual forming optic pieces 1040 that may include the intent of this invention.

The output product of the Voxel-based lithography optical equipment 500 may include numerous embodiments. In one embodiment, as shown at 900 a reactive product 940 will form on the surface of the forming optic 930 while still residing in the residual reactive chemical mixture 945. The action of removing the forming optic 930 with reactive product 940, from the chemical mixture 945 may include additional embodiments of the apparatus. In some such embodiments, the forming optic 930 and adhered reactive product 940 may be raised out of the chemical mixture 945 under the action of robotic automation for example.

Figure 12:
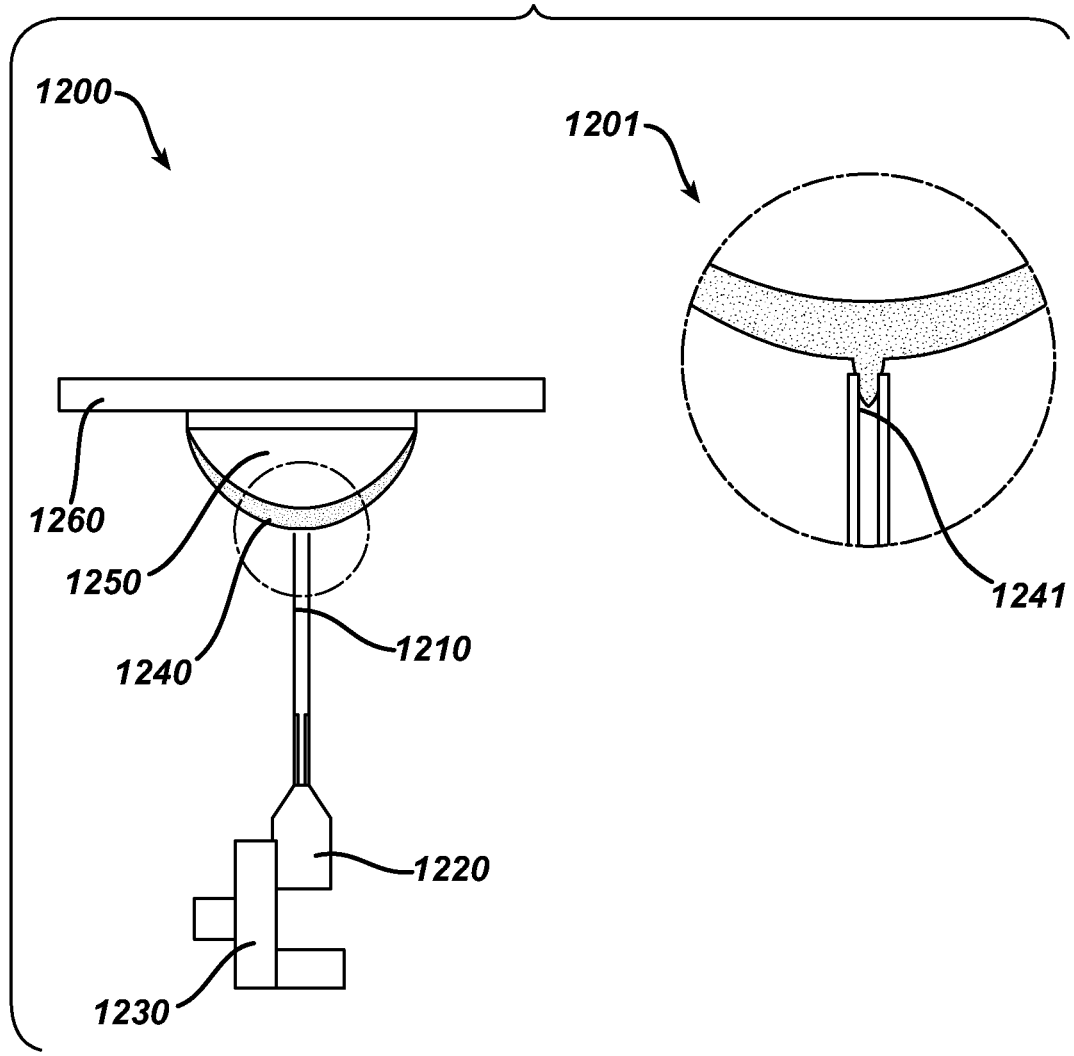
FIG. 12 illustrates an exemplary material removal apparatus that may be useful in implementing some embodiments of the present invention.

Referring now to FIG. 12 1200, a schematic representation of some aspects of an embodiment of a flowable chemical removal apparatus is demonstrated. The Lens Precursor is now demonstrated attached to a forming optic 1250, and an alignment plate 1260 attach thereon. The combination is demonstrated as an embodiment where the Lens Precursor's surface is facing downwards. The Fluent Lens Reactive Mixture 1240, will move under a variety of forces including that of gravity. A wicking capillary 1210, is positioned in close proximity to the Fluent Lens Reactive Mixture 1240, around and in the fluent chemical that has pooled at a low point along the lens surface. In a preferred embodiment the wicking capillary may include a polymer wicking model made from a Safecrit, Model HP8U Untreated Plastic Microhematocrit tube. By way of alternative example, the capillary may also include glass, metal or other material consistent with the physical and chemical/materials requirements of fluent chemical removal.

The fluent chemical 1240, is drawn into the capillary 1210, and forms a volume 1241 that is drawn away from the Lens Precursor. In one embodiment, the process may repeat a number of times. After processing, the Lens Precursor 1200 remains with a reduced amount of Fluent Lens Reactive Mixture adhered to the Lens Precursor Form 1750.

Various aspects of the Fluent Lens Reactive Mixture may be affected by this processing; including for example, that less viscous components in the Fluent Lens Reactive Mixture may be separated and removed. It should be apparent to those skilled in the art that there are many different embodiment options related to how the chemical removal process may be performed, all consistent with the scope of this invention.

In general, embodiment options may include numerous physical designs to draw away chemical from the surface. An example of a different embodiment may be the actuation of a vacuum system component 1220 to assist in drawing away the Fluent Lens Reactive Mixture 1240. By way of non-limiting example, another embodiment may be included of redundant copies of the capillary apparatus 1210, deployed with their points mimicking the shape of the forming optic surface 1250. Additionally, the chemical removal could be performed with a high surface area material, like sponge, or nanoscale materials with high surface area, as an example. Restating a concept described previously, an alternative embodiment may include controlling the rate of withdrawal of a Lens Precursor on a forming optic 930, from the Reactive Mixture 945. The surface tension forces, in this embodiment may include a form of chemical removal, with similarity to a capillary wicking step; and result in the reduction of the amount of Fluent Lens Reactive Mixture 1710 remaining when the Lens Precursor results. From a generality perspective, the numerous embodiments of apparatus that could perform the function of removal of portions of the Fluent Lens Reactive Mixture 1240 include art within the scope of the invention.

The vacuum system component 1220, in the preferred embodiment, has an alternative function to that previously defined. In the processing of multiple Lens Precursors, the chemical removal apparatus 1200 will perform chemical removal numerous times. The vacuum system component 1220, may be used to clean and evacuate the capillary apparatus 1210. A different embodiment may include a cleansing solvent being flowed through the capillary apparatus 1210, in conjunction with the vacuum system component 1220.

Figure 13:
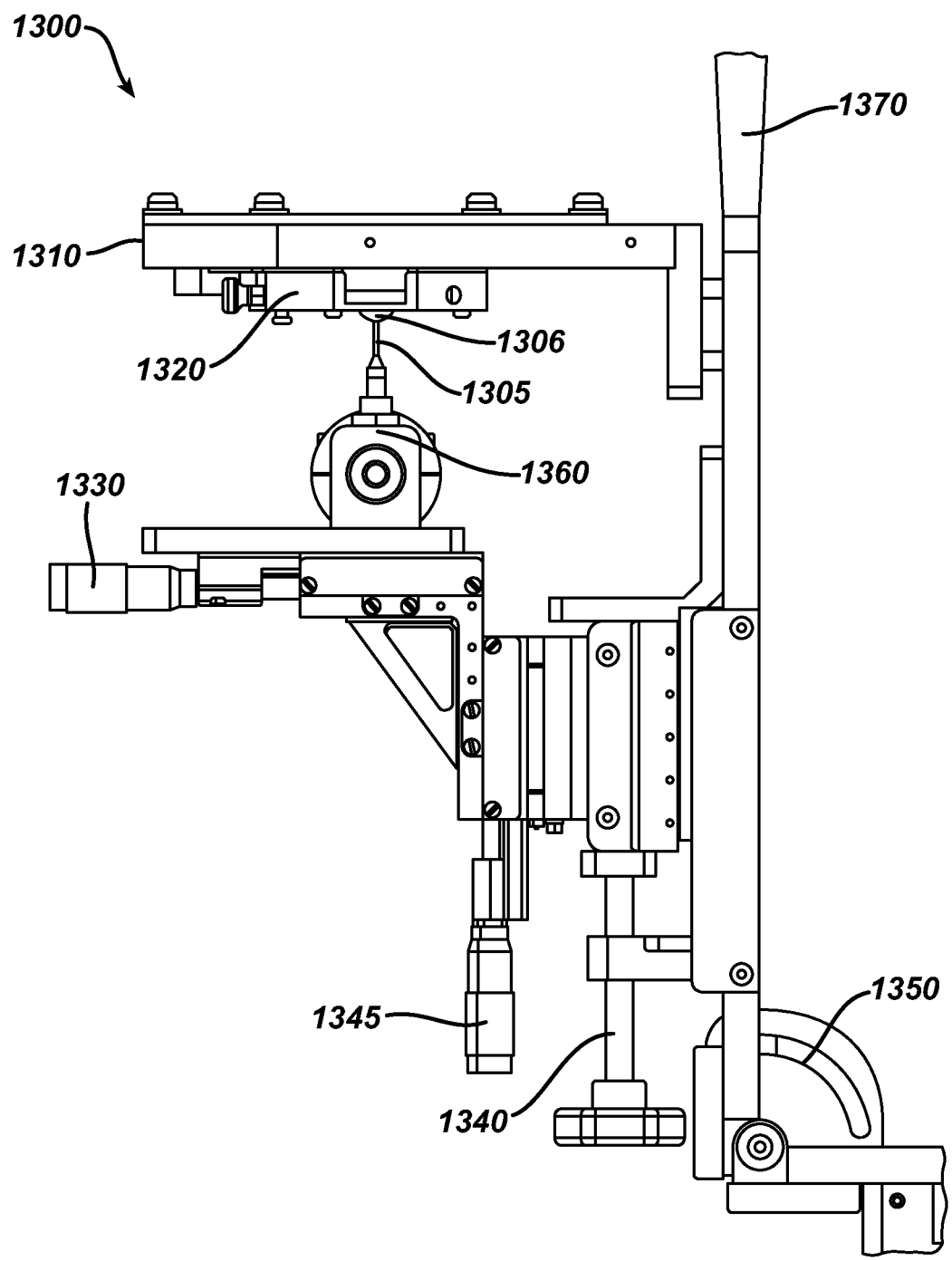
FIG. 13 illustrates the gross motion systems of an exemplary material removal apparatus that may be useful in implementing some embodiments of the present invention.

Generally the embodiments 1200 depicted in FIG. 12 illustrate how a chemical removal system could function, and it focuses in detail and in a close up view, on the components involved. By comparison, FIG. 13, depicts a more global view of some embodiments of a chemical removal system 1300 embodiment to aid in the description both of the equipment employed in a preferred embodiment and some alterations. FIG. 13 1300 includes a capillary removal component 1305 and a Lens Precursor mounted on a forming optic and forming optic plate 1306 in a similar configuration and with the Lens Precursor pointing directly down.

Referring now again to FIG. 13, it may be apparent that the placement of the wicking capillary 1306 may in alternate embodiments be located at a position off of the center of the forming optic Lens Precursor 1305, center point. Item 1330 indicates a single dimension, of a xy translation table, where the adjustment is used to offset the capillary to forming optic center alignment. By way of example, the 1330 is depicted in a preferred embodiment manual vernier adjustment form. However, it may be clear to one skilled in the art that the adjustment may be performed by automation comprising stepping motors for example; and more generally, various levels of escalating sophistication in automation equipment for the location of the XY translation table would be anticipated within this invention. From an even higher level of generalization, and to simplify the following discussion, it may be assumed that any movement capability on the apparatus may have similar freedom in embodiment possibilities.

Item 1320, a forming optic holding apparatus, includes an apparatus to flexibly hold a forming optic in a desired firm location. The forming optic piece, as depicted as 1000 in previous discussion may employ similar location schemes as when located in the Voxel-based lithographic apparatus 500 in this embodiment. Alternative embodiments may enable the transfer of the forming optic holding apparatus 1000 under automated means. It should be apparent that numerous alternatives in manners of holding the forming optic and locking it into an appropriate location in a flowable chemical removal apparatus include consistent aspects of the current invention.

The discussion thus far has generally depicted embodiments with the axis of the forming optic located such that it is perpendicular to a horizontal plane and in the direction of gravitational forces. Alternative embodiments may allow a rotation of the axis at some angle about this perpendicular orientation. Item 1350 includes an adjustment means to alter the angle the forming optic axis makes with gravity. The fundamental effect of such a change would be that the fluent matter 1710 on the Lens Precursor will tend to pool at a location off of the center of the forming optic center. In some embodiments there may be advantages to drawing off fluent media at a location off center.

A number of indicated items in FIG. 13 relate to the location in a vertical manner of a capillary wicking apparatus 1306 to the fluent media on the Lens Precursor. For example 1340 may include a gross or rough adjustment of this dimension by moving the stage affixed to the wicking capillary 1306 along the vertical axis. Additionally, 1345, includes a fine level adjustment for the same movement possibility. It is equivalently possible to adjust the forming optic mounting stage 1310 relative to the capillary wicking apparatus 1306 along the same axis. Item 1370 includes a fine adjustment apparatus for this purpose.

Figure 14:
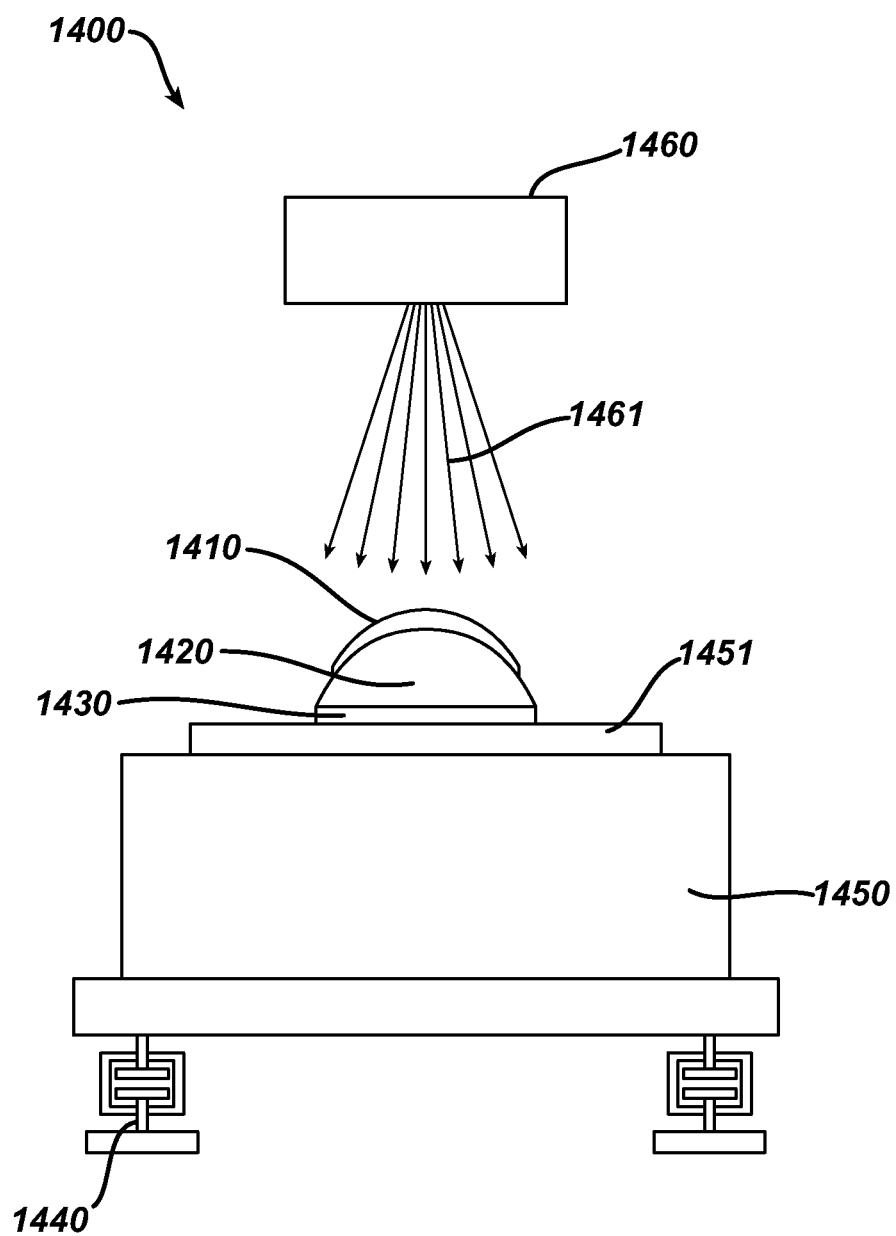
FIG. 14 illustrates an exemplary stabilization and fixing apparatus that may be useful in implementing some embodiments of the present invention.

Referring now to FIG. 14, a source of fixing radiation 1460 may include a similar light source to that previously discussed in the context of the Voxel—lithography optical system 520 may be employed. For example, in some embodiments, an AccuCure ULM-2-420 light source with controller from Digital Light Lab Inc. (Knoxville, Tenn. USA) 1460 may constitute an acceptable source of the fixing radiation 1461. After the appropriate parameters are performed for stabilization, the controller for the fixing light source 1460 is switched to an on position exposing the Lens Precursor and surroundings to the fixing radiation 1461, and forming an ophthalmic lens of one embodiment form. From a general perspective, there may be numerous embodiments relating to the stabilizing or otherwise moving the Fluent Lens Reactive Mixture across the Lens Precursor Form 1730 surface and then in some manner irradiating with fixing radiation.

By way of example, some alternative embodiments for processing in the fixing apparatus may include a Lens Precursor Form where fluent material may have been washed off in a washing system. As this Lens Precursor Form in a fixed form may include a lens of certain characteristics in its own right, it is within the scope of the invention to anticipate embodiments that involve the use of the fixing apparatus in a manner that does not require the stabilization apparatus per se. In a more general sense, the invention may anticipate numerous embodiments of materials and forms where the fixing apparatus may fix materials that do not require a previous flowing of a fluent material on the surface to be fixed. By way of example, a Lens Precursor Form that has been formed with the Voxel-based lithographic optical system and has Fluent Lens Reactive Mixture 1710 washed off may still include an embodiment where the fixing apparatus is capable of fixing the Lens Precursor into a lens.

Some embodiments include alternative manners to cause the movement of the Fluent Lens Reactive Mixture 1710. By way of example, in some embodiments, agitating a Lens Precursor surface including Fluent Lens Reactive Mixture 1710 may enable the movement of the Fluent Lens Reactive Mixture 1710. Additionally, for example, it may be desirable in some embodiments to spin a Lens Precursor around a central axis in a spin coating manner common to film processing.

Still other embodiments may include minimizing gravitational force experienced by the Fluent Lens Reactive Mixture 1710 by way of dropping the Lens Precursor 1410 in a controlled manner over a certain distance. Additional embodiments may alter the effect of gravity by changing the level of the surface 1450 upon which the Lens Precursor 1410, forming optic 1420, and holder 1430, are rested. With a different surface level, the forces on the Fluent Lens Reactive Mixture 1710 in the center optic region may vary and cause movement.

In another aspect, some embodiments may include chemical or physical changes to the Fluent Lens Reactive Mixture 1710. By way of example, an alternative embodiment may include the introduction of a solvent material in and around the fluent reactive chemical in such a manner to change its fluent nature. Additionally, said added material may effect the surface energy properties of components in the Lens Precursor system 1700. The properties of the fluent reactive chemical 1710 may be partially altered through the use of the fixing irradiation 1461, to alter the fluent nature in a manner that is distinct from fixing. Numerous alternative embodiments of a general nature relating to altering properties of the fluent chemical system may be anticipated by the nature of this invention.

At a significantly fundamental level, the nature of the reactive chemical mixture 945 may interact with the various embodiments of apparatus to enable different results. It should be apparent that the nature of the stabilization and fixing apparatus 1400, and variation in embodiments that derive from changing the fundamental chemical components in the reactive chemical mixture include embodiments within the scope of the invention. By way of example, this could include for example changes in the wavelength employed for fixing radiation and may introduce apparatus embodiments that have flexibility in said wavelength of fixation radiation.

As the materials of the Lens Precursor may include part of a formed lens, it may be obvious to one skilled in the art that the environmental controls in and around the stabilization and fixing apparatus include important embodiment aspects. For example, control of particulate matter with, for example, HEPA filtrated air flow may include one embodiment of environmental control. As the fluent media is still sensitive to actinic radiation, controls over stray light entering the environment include additional embodiment options. As well, humidity and other gaseous contaminants may effect lens quality and control over these environmental conditions may include alternative embodiments. The numerous aspects of environmental control that may be apparent to one skilled in the arts include art within the scope of this invention.

The product of treating a Lens Precursor of some embodiment with the stabilization and fixation apparatus may include devices that are similar to or forms of ophthalmic lenses. In many senses this material has characteristics that directly relate to a final, hydrated ophthalmic lens. However, many embodiments after lens stabilization and fixation create an entity, still on the forming optic and holder 1430 that in the non-hydrated form may be subject to various forms of metrology.

Figure 15:
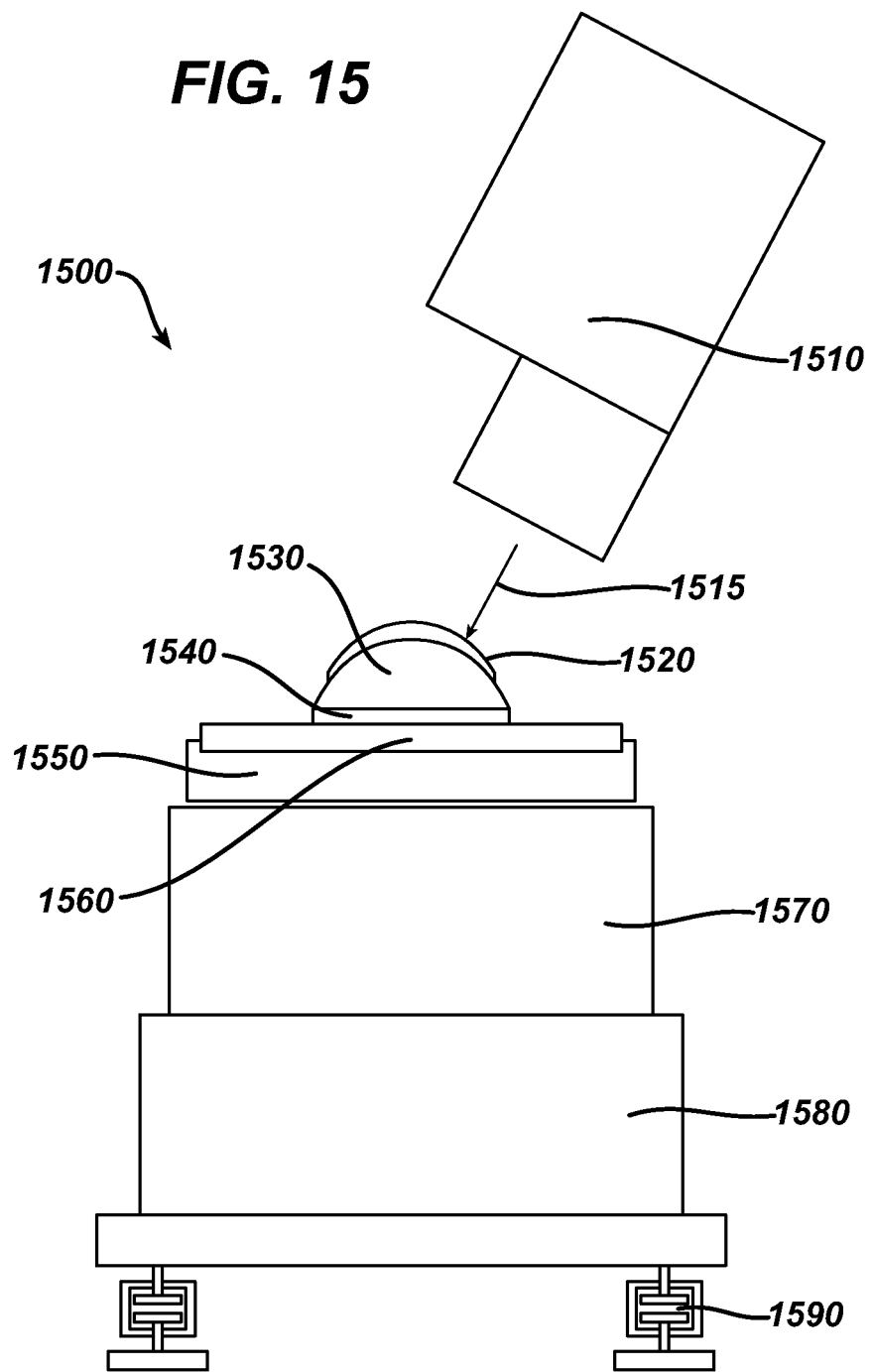
FIG. 15 illustrates an exemplary metrology system that may be useful in implementing some embodiments of the present invention.

FIG. 15, a representation of an embodiment of a metrology apparatus capable of measuring optical and material characteristics is displayed. It may be obvious that metrology may be possible with both "dry" lenses, as would be the result following processing with the aforementioned fixation apparatus 1400; and with hydrated lenses. This embodiment, however, focuses on metrology of dry lenses which desirably are still affixed to the forming optic. Referring to FIG. 15, the dry lens 1520, is still affixed to the forming optic 1530 and its appropriate holding components 1540. For an example, this holding component 1540, is affixed to a pair of mounts 1550 and 1560 that together enable controlled rotational movement of the lens about a central axis.

In some embodiments, the interaction of laser light 1515, from a laser displacement sensor 1510 such as one manufactured by Keyence (Osaka, Japan) model LT-9030, with the surface of the lens sample 1520 occurs as the sample 1520 forming optic 1530 and holding clamp 1540 rotate axially. A rotary servomotor 1570, drives a rotary bearing kinematic stage upon which the sample assembly sits. For stability of the rotation, the center of mass of the lens sample assembly is set, in some embodiments, as close to the center point as possible. As the stage rotates, the laser displacement sensor 1510, measures displacement of multiple points along axial rings of the surface of the lens 1520. After the stage rotates a full turn, the displacement sensor 1510 is moved azimuthally. Each movement creates a new circular profile around the surface of the lens. The process in this embodiment repeats until the entire lens surface has been profiled. By measuring a particular forming optic 1530 without the lens sample 1520, the surface location of the forming optic may be obtained in an equivalent spherical notation format. Subtracting this result from the result with the lens upon the optic results in a thickness mapping of the lens product. Again, unique identification of a forming optic in an electronic format, via an attached RFID or by some other means, may include another embodiment form for the apparatus.

In some embodiments of this type, a free vibrational displacement of the sample surface 1520 relative to the sensor 1510 can include a significant error on the displacement measurement obtained by the system. Therefore, vibrational damping and isolation may be included. Accordingly, in some embodiments a massive supporting table 1580 sitting upon vibrational isolation mounts 1590 can be utilized to minimize vibrational effects. Some embodiments may be less sensitive to vibrational noise than others; however, generally speaking various methods of minimizing vibrational energy transfer modes into the environment around the various forms of detectors and the sample locating apparatus include embodiments within the scope of the invention.

Other embodiments may employ different measurement systems, in some cases in addition to the first described laser displacement sensor, to extract lens characteristics. By way of non-limiting example, a Shack-Hartmann Wavefront Sensor available from Thorlabs Inc (Newton, N.J., USA), may also be used in some embodiments to determine thickness of the formed lens body.

From a general perspective, there may be a significant diversity in metrology devices that are anticipated within the scope of this invention, including in part and for example, techniques to characterize the refractive index, radiation absorption, and density. Aspects relating to environmental controls may also be anticipated including for example, particle detection. These various techniques may be located in the same environment and location as the exemplary metrology device 1500, or in alternative embodiments may include additional locations within or external to the generalized system environment.

Collection, storage and communication of metrology and logistical data relating to particular samples and components used in the production of particular samples include a general embodiment principle of the invention. These various data may be useful in establishing feedback loops for control of lens characteristics. In an exemplary and preferred embodiment, the output from the laser displacement sensor based metrology apparatus 1500 for a lens sample 1520 is recorded and stored in a computing system. The individual forming optic piece, in one embodiment 1530, may have had the similar laser displacement metrology performed on it before being used in the production of said sample 1520. Through use of the data computing system the displacement data may be processed in some manner to generate a representation of the thickness of the lens sample thus produced.

Within the computing system a desired model for the lens sample, useful in providing starting parameter set points for the various components in the lens fabrication system, may be compared to the manipulation of the displacement data for the sample, 1520, and forming optic 1530. In some embodiments, various location points in a model may be mapped or correlated back to the individual components of the imaging system; in the preferred embodiment, a particular Voxel element in the Voxel-based lithography optic system. Via adjustment of the parameters for that Voxel, a next lens or Lens Precursor sample may be produced with adjusted performance compared to the previous sample. Within the numerous embodiments of metrology and the various calculational algorithms and apparatus, there should be a clarity to one skilled in the art, that many alternative embodiments of obtaining, processing, modeling, feeding back, and communicating of data include elements within the scope of this invention.

In some embodiments, metrology data of a particular system relating to the thickness of a produced lens sample 1520 may be enhanced via the use of alignment features designed into the profile of a Lens Precursor Form 1720. In the exemplary FIG. 4, 400, thickness metrology obtained in a manner similar to that described above was obtained. Other discussions of this 400 will be made elsewhere in this disclosure; but for use of understanding an alignment embodiment, the 440 may be considered. Item 440 may include a relatively deep profile recess in the surface of a lens sample 1520. The design of such a feature may be useful in orienting numerous processing steps in the apparatus. In one embodiment, the signal related to 400 may be extracted or recognized by an algorithm or manipulation of the metrology data. Such an extraction may be useful in locating portions of the various apparatus that are in proximity to or provide processing upon a location relative to the alignment feature 440. It may be apparent to one skilled in the art that numerous different embodiments of alignment features including the use of marking materials and designs of profile features among others are possible and include art within the scope of this invention.

Some alternative embodiment's use of metrology data produced by a metrology system 1500 may utilize this data for diagnostic and control purposes for the entire ophthalmic lens production system or its various apparatus, therein. By way of non-limiting example, storage of the above mentioned measurement of a forming optic 1530, may result in a history of such measurements. Through alternative computation and algorithmic processing, the characteristics of the surface could be compared over time and changes in those characteristics, of either an abrupt or steady manner might be used to flag a need for diagnostic intervention of some kind. One example, in the many possible causes of such a signal change, might include that a forming optic has received a surface scratch of some kind on its surface. In additional embodiments, statistical based process control algorithms could be used to both establish acceptable limits on metrology results obtained and to flag in an automated sense a valid change in measurement. Still additional embodiments may provide means for automation within the system to react to these flags in an automated means. However, from a general perspective, the invention scope anticipates these and numerous other embodiments of using metrology data from, for example, a system 1500, to diagnose and control the overall system.

The embodiments for the metrology apparatus discussed thus far may have generally pertained to metrology on a "dry" lens sample 1520 or it's forming optic 1530. From a more general perspective, however, similar or additional metrology embodiments may derive from measuring characteristics of other forms in the total system. By way of non-limiting example, the "dry" lens may in some embodiments continue processing and become hydrated. Metrology on such a newly defined sample 1520, may include an example of the more general embodiment discussion. A further example may include performing metrology on a Lens Precursor sample 1700. Thus, in a general sense, there are numerous embodiments that are anticipated in the scope of the invention to perform metrology on the various forms of material used in processing or in comprising a product in an ophthalmic lens production system of this kind.

Figure 16:
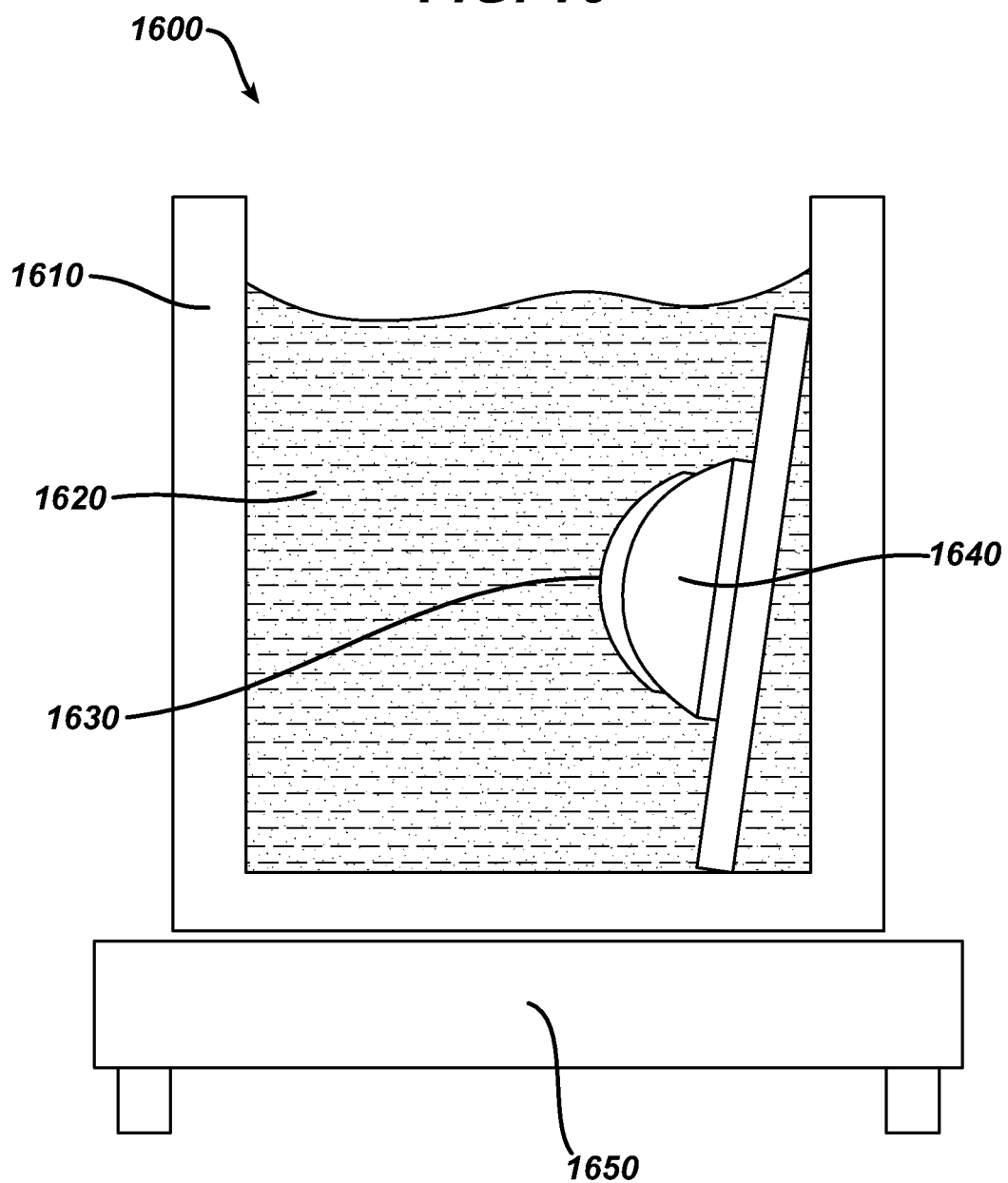
FIG. 16 illustrates an exemplary hydration and removal system that may be useful in implementing some embodiments of the present invention.

Referring now to FIG. 16 an embodiment of apparatus to perform these steps, referred to as an hydration apparatus for simplicity, is depicted 1600. The apparatus is included of a vessel for the containment of the hydration fluid 1610. A fluid bath 1620, that a lens 1630, and forming optic holder 1640 are immersed in and a thermal control unit 1650, to maintain the bath at a constant temperature.

In a preferred embodiment, the fluid bath 1620, is included of deionized (DI) water into which a surfactant has been added. There are numerous embodiments for this bath that are practiced in the art and are consistent with the scope of this invention. In an alternate embodiment, the fluid bath 1620, may be included of a mixture of an organic alcohol, sometimes in a mixture with deionized water and a surfactant. Therefore, some embodiments of the vessel 1610, may be included of materials that are consistent with containing a volume of water or organic alcohols and also transmitting thermal energy between a temperature control unit 1650 and the fluid bath 1620. From a perspective of generality, there may be numerous alternative embodiments, comprising materials of vessels, designs of vessels and means of filling and emptying vessels that fall within the scope of hydrating and cleansing a lens and include embodiments of this inventive art.

In some embodiments, the temperature of the bath is elevated to speed the hydration, cleansing and removal operation. In one such embodiment, the temperature may be maintained by the presence of a hot plate with internal sensing apparatus 1650. More advanced embodiments may include alternative manners to heat the fluid including alternative irradiative and conductive materials and apparatus. And, additional embodiments may include different manners to monitor the bath temperature and control it within a temperature zone. A still further and more advanced embodiment could include the ability to vary or program the temperature of the fluid bath in time. It may be obvious to one skilled in the art that numerous embodiments exist to control a hydration bath's temperature that includes embodiments within the scope of this invention.

As the exposure of the lens 1630, and forming optic 1640 to the fluid bath proceeds and the lens becomes hydrated, in some embodiments the lens body will swell and eventually detach from the forming optic 1640. Therefore some embodiments may include means of catching the detached lens for assembly into appropriate storage and packaging means. Further embodiments may include, locating and picking the detached lens from the fluid bath media 1620. Alternatively, embodiments may provide the ability to strain said fluid bath media 1620 during a drain process to isolate a lens from the fluid. From a general perspective, numerous manners of localizing a lens and handling it into a storage means include consistent embodiments within the scope of this invention.

Figure 17:
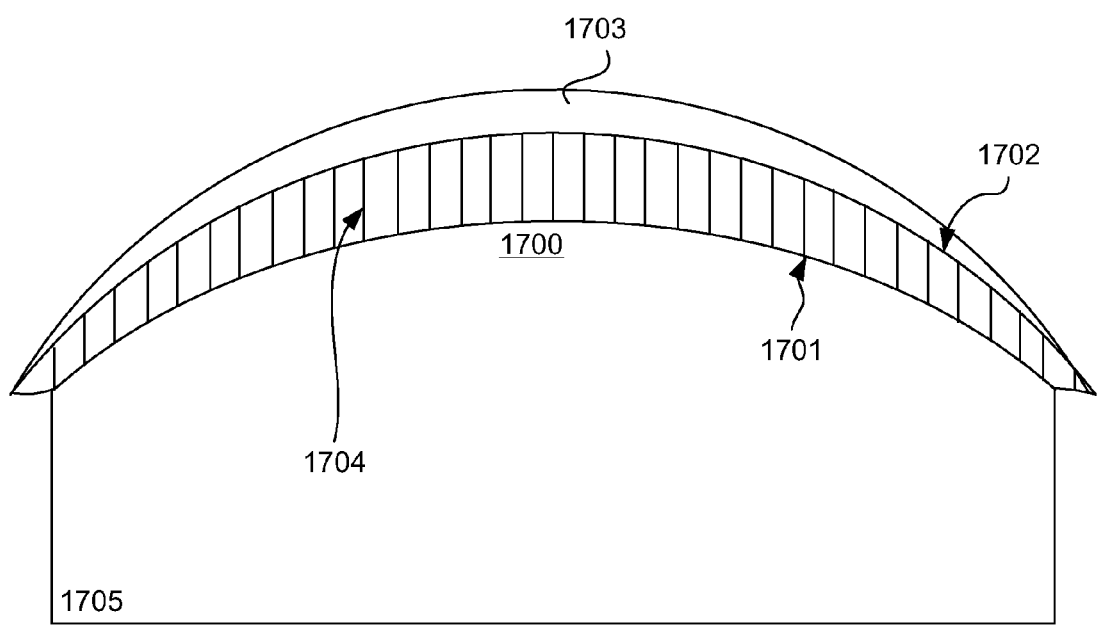
FIG. 17 illustrates an exemplary cross sectional representation of a Lens Precursor with voxel formation and a layered volume of fluent lens reactive media.

Referring now to FIG. 17, a Lens Precursor 1700 is illustrated formed via polymerization on a voxel 1704 by voxel 1704 basis. Some embodiments may include a Len Precursor, which includes fluent lens Reactive Mixture, or crosslinkable material 1704 that is formed by voxel by voxel polymerization. As a forming optic and a voxel by voxel structure of reacted material are removed from a reservoir of Reactive Mixture, there may be a viscous material that adheres to the surface of the voxel by voxel structure or Lens Precursor Form. This combination of a Lens Precursor Form and the fluent lens reactive media 1704 on it that is capable of being formed after further processing into part of an ophthalmic lens device is what makes up a Lens Precursor.

In some embodiments, the Lens Precursor assumes a three-dimensional shape, however, because of the fluent nature of the adsorbed reactive media, the entity does not have a fixed three-dimensional form.

The Lens Precursor may also include a first surface 1701 which may be formed along a substrate 1705, such as, for example a substrate with an optical quality surface. The first surface 1701 includes a portion of media with a first crosslink density degree at least partially polymerized above a gel point. The Lens Precursor 1700 also includes a second surface 1702 second surface comprising a second crosslink density degree of cure at about the gel point or less than the gel point.

In some embodiments, portions of the fluent lens reactive media may be removed from the Lens Precursor. By way of non-limiting example, the fluent lens reactive media may be removed by capillary action. In some embodiments, the methodology may include a dwelling step to allow some of the fluent lens reactive media to pool together before the step of capillary action is performed. In still further embodiments, the lens surface may be positioned so that its surface axis is angled relative to the direction of gravity. It may be obvious that numerous embodiments relating to methods to remove fluent lens reactive media with a capillary based apparatus may be possible and include art within the scope of this invention.

In other embodiments, the methodology to remove fluent lens reactive media may include alternative apparatus to the capillary wicking equipment. For example, a method comprising using an absorptive surface to remove the fluent media may include some embodiments. Additional embodiments may relate to methods using apparatus with many capillary points rather than the one described in detail. Still further embodiments may include methods to spin process the Lens Precursor to remove the fluent material. Any of the numerous methods to use an apparatus to remove some of the fluent material, as may be obvious to one skilled in the arts may include aspects within the scope of this invention.

A different type of embodiment to remove material from the top surface of the Lens Precursor may include the method of defining relief features into the lens body for this purpose. In these types of embodiments, features such as the drain channels mentioned in a previous section may be designed for the purpose of creating a location to enable the relatively low viscosity fluent media to flow out of thereby creating below grade space for the relatively higher viscosity to flow into. In further embodiments, the use of spinning of the lens body may also include embodiments to remove lens material in conjunction with designing relief features for the material to flow into. It may be obvious to one skilled in the arts that embodiments comprising the various embodiments of different relief surface design also include art within the scope of this invention.

During stabilization, fluent lens reactive media may flow under various forces to find a low energy and relatively stable state along the surface of the Lens Precursor Form.

At a microscopic level, it may be evident, that a surface of a precursor form may locally have some level of roughness to it. Numerous aspects of the forming embodiments may determine the nature of this roughness, for example of one such case, the effect of the inhibitor to relatively abruptly stop reaction in the vicinity that it starts. The surface forces of the fluent media, frictional and diffusion forces, the force of gravity and other applied forces combine in many embodiments to create a smooth covering that has flowed over the topography. In the methodology that determines these forces there are numerous embodiment possibilities within the scope of the invention.

In some embodiments, a Lens Precursor may be configured to allow the fluent lens reactive media to flow under the force of gravity. The method to perform this may include the movement of the Lens Precursor into different orientations to aid in flow. Alternative embodiments may include the opposite strategy by maintaining the Lens Precursor in a fixed state with as little movement as practical. Still further alternative embodiments may include subjecting the fluent material to the forces related to spinning the Lens Precursor around an axis. In some embodiments, this spinning may be performed around an axis centered in the middle of the Lens Precursor. In alternative embodiments, said spinning may include rotating the Lens Precursor around an external axis point while either facing the top of the Lens Precursor towards or away from the axis point or at the myriad possible orientations between such. In still other embodiments the Lens Precursor may be processed in a free fall environment to minimize the effect of gravity. It may be apparent to one skilled in the arts that there may be numerous methods related to the application of fluent forces to the Lens Precursor during a stabilization method.

In other embodiments, the fluent nature of the fluent media may be altered by methodology. In some embodiments, the viscosity of the fluent media may be altered by means of dilution or solvation. Alternative embodiments may include evaporating some of the diluent to increase viscosity. An exposure to some level of actinic radiation may include still further methods to alter said fluent films viscosity. There may be numerous embodiments relating to altering the viscosity of the fluent media.

In still other embodiments, the surface energy related forces on the fluent lens reactive media may be altered by methodology. In some embodiments this may include the addition of surfactants to the nascent Reactive Mixture. In alternative embodiments additives or chemical reactants may be added to the Lens Precursor for the purpose of altering the surface energy.

Figure 18:
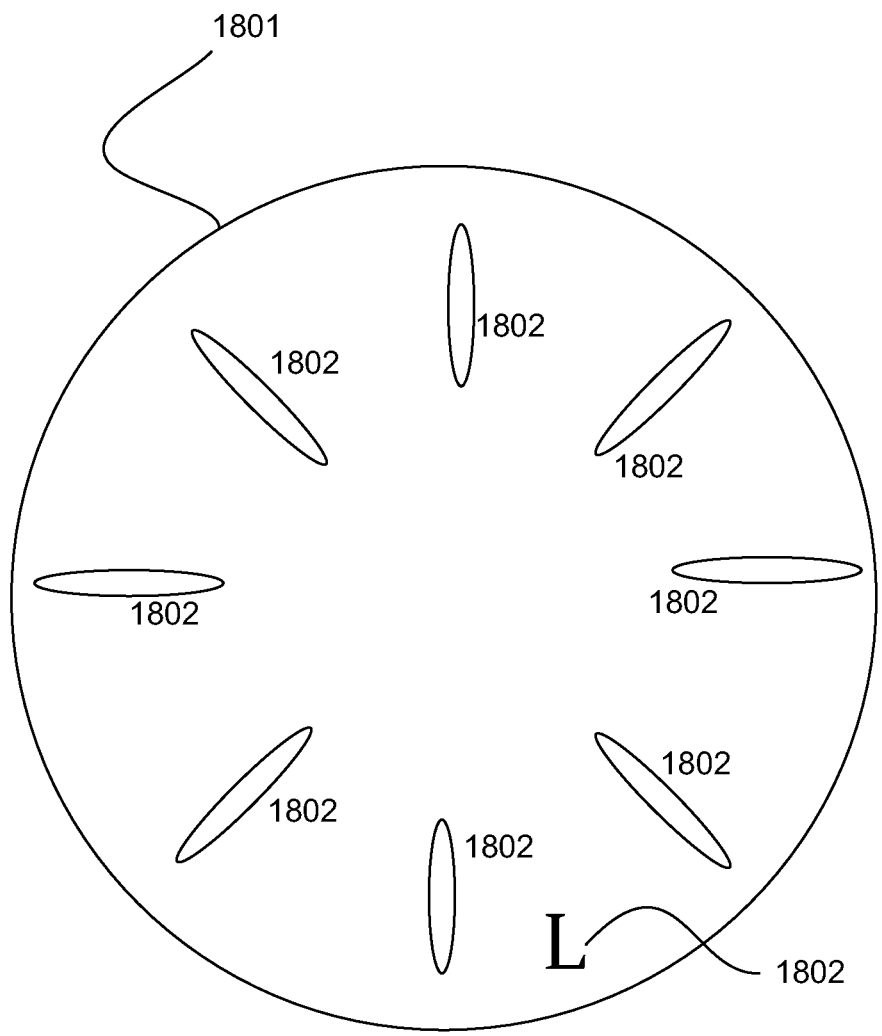
FIG. 18 illustrates a Lens Precursor with exemplary channel artifacts.
Figure 19:
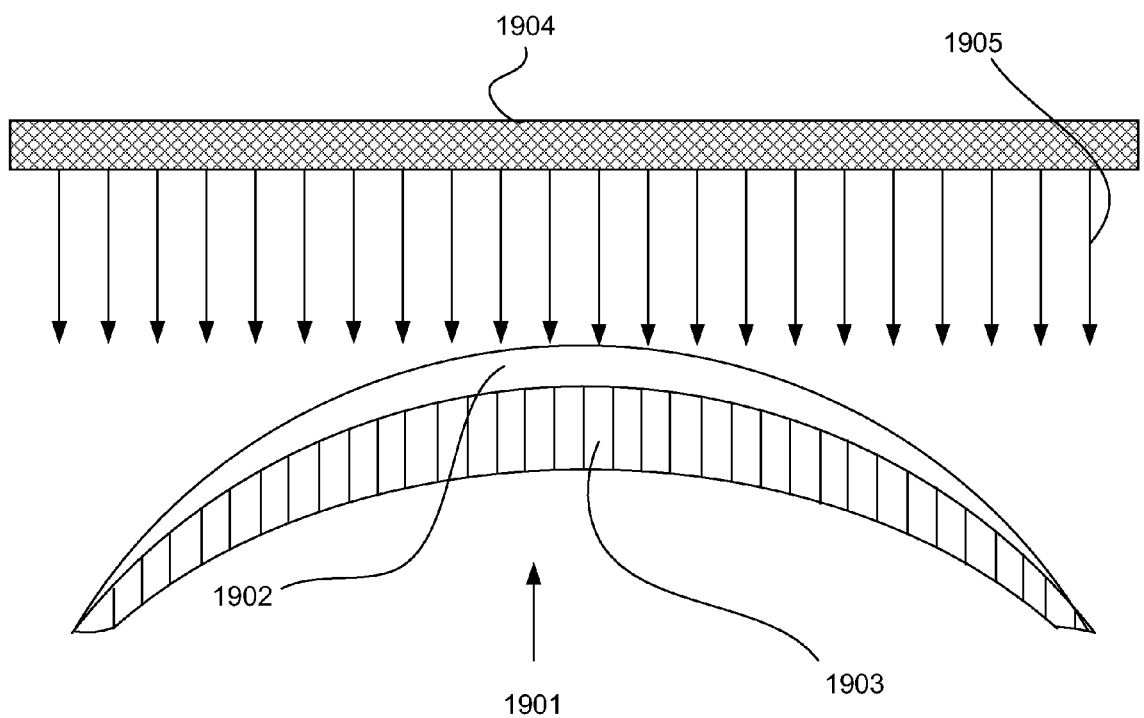
FIG. 19 illustrates a Lens formed via exposure of a Lens Precursor to actinic radiation.

Referring now to FIG. 18, in some embodiments, the design of the Lens Precursor 1801 may include artifacts 1802 to facilitate a flow condition of the fluent lens reactive media. Channels 1802, as a non-limiting example, may include a means to draw fluent lens reactive media away from a region of the Lens Precursor. In alternative embodiments, design methods relating to abrupt profile change may include methodology for providing altered stabilized states. Artifacts may be formed in almost any variety, shape and assortment supportable by the area of a Lens Precursor. In some embodiments, an artifact 1803 includes a marking, such as one or more alphanumeric characters. Other markings can include an alignment mark. The artifacts 1802-1803 are formed according to a DMD script.

From a general perspective, these various embodiment types should not limit the generality of methods to create a fully stabilized or partially stabilized or unstabilized nature of the fluent lens reactive media in the methodology comprising stabilization. Combinations of the various embodiments for example may be obvious, to an expert in the arts, additional embodiments for said methodology.

After a methodology of stabilization has been performed the fluent material may in some embodiments be subjected to a next methodology type indicated as item 133, fixation, to convert it into a non-fluent state. In some embodiments, the nature of the actinic radiation applied during the fixing method may include alternatives. The spectral band or bands applied may be an example of one type of methodology embodiment. Alternative embodiments may include the intensity of the radiation applied. In alternative embodiments, the application of various aspects of the fixation irradiation may include time dependency. By way of non-limiting example, an initial wavelength band may include a first step that then is changed to a different band. The universe of embodiments that may be obvious to one skilled in the art for the method of defining the light conditions are within the scope of this invention.

In some embodiments of item 133, the fixation method may include different paths that the irradiation may take. In an example of type of embodiment, the irradiation may occur on the front surface of the Lens Precursor; or alternatively through the back surface. Still other embodiments may derive from multiple sources of irradiation, some perhaps with different light characteristics to create different effects of the actinic radiation in the Lens Precursor entities. Still further embodiments may derive from the fixation method comprising other energy forms than radiation. By way of generality, the numerous methods that may include a fixation step are within the scope of the invention.

In some embodiments, after fixation has occurred, the processing of the Lens Precursor 130, has been completed. This completed product may, in some embodiments, be processed further. This product type includes a good example of the type of art indicated in block 120 of FIG. 1, alternative forming of a precursor. By way of non-limiting example, if the product of the fixation were introduced back into the voxel based lithography methodology a second layer of processing may occur. This multipass aspect introduces many embodiment methodology options.

In some embodiments, the complex Lens Precursor that may be formed from multiple passes which may include by way of non-limiting example, a first step where an ophthalmic lens surface is defined and a second step where profile features are added to the surface. Other complex embodiments of the methodology may include, for example, a first pass through the voxel based lithography system with conditions, as some of the previous examples described, that make for isolated voxel columns along the Lens Precursor Form. A second voxel based lithography step may then include filling in the features between voxel columns with a material of a different characteristic. Continuing a third pass through the system may then define an ophthalmic lens. It may be obvious that the generalization to methodology of multiple passes through the system, each of which may have the abundant different embodiment possibilities discussed, may include a great many different embodiments all within the scope of the invention.

In some other embodiments, the Lens Precursor may be formed by applying a fluent reactive media onto a Lens Precursor Form. For example, the Lens Precursor Formed by way of the voxel-based lithography methods may be subjected to a washing system as an extreme method of removal of the fluent lens reactive media. A Lens Precursor Form will derive from the washing method. In some embodiments, this Lens Precursor Form may next be subjected to a method of adding a next fluent lens reactive media to its surface. The methodology of adding the next fluent media to the surface, in some embodiments may include dipping and removal of the Lens Precursor in methods similar to the embodiments described in item 117. The resulting Lens Precursor may now have a different distribution of monomer and multimeric molecules, or in some embodiments may include different polymer chemistry than that used to form the Lens Precursor Form. It may be apparent to one skilled in the art that numerous embodiments comprising the methodology to apply fluent lens media onto a variety of Lens Precursor Form embodiments includes art within the scope of this invention.

In an alternative set of embodiments, the Lens Precursor Form may be formed by other means than voxel-based lithography. In a first, non-limiting example, various embodiments may be possible by using stereolithography as the basis for forming the Lens Precursor Form. In some embodiments, this stereolithographically formed Lens Precursor Form may have fluent lens reactive media from a removal methodology as in 117, but other embodiments may include adding a fluent lens reactive media to the stereolithographically formed base. Alternative embodiments may be possible by using a masked based lithography process to determining the Lens Precursor Form and then using it in the methods mentioned. Still further embodiments may include the use of a Lens Precursor Form that is formed by a standard cast molding process common in the manufacture of ophthalmic lenses, and then forming a Lens Precursor in the methods mentioned. It may be apparent that the numerous embodiments that form a Lens Precursor Form may include methods for forming a Lens Precursor.

Referring now to FIG. 20, a Lens 2001 is illustrated that is formed from a Lens Precursor by exposure to sufficient actinic radiation to polymerize unreacted polymerized crosslinkable material. Embodiments can include a first portion 2003 that includes multiple voxels of polymerized crosslinkable material and a second portion 2002 with a layered volume of crosslinkable material polymerized above the gel point of the crosslinkable material.

A source of actinic radiation 2004 can include, for example, a light source 2004 producing radiation 2005 of sufficient intensity and wavelength to be actinic to the crosslinkable material. In some embodiments, the actinic radiation can include multiple source points of light rays (as illustrated). Other embodiments may include a single source of light providing actinic radiation.

In some embodiments, a formed or fixed Lens may be adhered to a surface of a forming optic. In some embodiments the Lens may be hydrated. Hydration may include, for example, submersion in a solution, such as an aqueous solution or IPA solution. In some embodiments, the solution may be heated to a temperature of between 60 degrees and 95 degrees centigrade.

The immersion methods may, in some embodiments, cleanse the lens body and hydrate it. In the process of hydration, the lens may swell and release from the forming substrate that it is adhered to.

What is claimed is:

1. A method of forming an precursor form from which an ophthalmic lens can be made, the method comprising:

positioning a substrate comprising a surface with an arcuate optical quality area in contact with a crosslinkable volume of reactive mixture contained within a vessel, wherein the reactive mixture comprises a photoabsorptive component and wherein a shape of the vessel does not influence a shape of the formed precursor form;

dividing a modulated light beam of actinic radiation with a digital mirror device into multiple beams of light including a first set of beams and a second set of beams, wherein one or more wavelength(s) of said actinic radiation comprises a wavelength at least partially absorbed by the photoabsorptive component;

transmitting a first actinic radiation of the divided beam through the substrate by selectively controlling a time and intensity of each of said beams of light within said first set of beams so that each beam selectively polymerizes a first portion of the volume of reactive mixture on a voxel by voxel basis to a respective predetermined depth of cure starting at the surface of the optical quality area of the substrate and extending into the volume of reactive mixture, wherein the transmission of the first actinic radiation forms a first area of a lens precursor comprising a first index of refraction; and transmitting a second actinic radiation of the divided light beam through the substrate by selectively controlling a time and intensity of each of said beams of light within said second set of beams so that each beam selectively polymerizes a second portion of the volume of reactive mixture on a voxel by voxel basis to a respective predetermined depth of cure starting at the surface of the optical quality area of the substrate and extending into the volume of reactive mixture, wherein the transmission of the second actinic radiation forms a second area of a lens precursor comprising a second index of refraction;

wherein the depth of cure of the first and second portions of the reactive mixture is less than a depth of said volume of reactive mixture within said vessel in the path of said actinic radiation; and wherein the first and second areas of the lens precursor are spatially distributed within an optic zone thereof.

2. The method of claim 1 additionally comprising the step of forming additional areas comprising different indexes of refraction.

3. The method of claim 1 wherein the first or second portion additionally comprises a silicone component.

4. The method of claim 1 wherein the first portion comprises a first optical surface.

5. The method of claim 4 wherein the second portion comprises a second optical surface.

6. The method of claim 1 wherein each ray of actinic radiation reflected towards a portion of the crosslinkable material for a period of time comprises a predetermined wavelength.

7. The method of claim 6 wherein the second portion is formed via exposure of a reactive mixture to multiple rays of actinic radiation originating from multiple points.

8. The method of claim 1 additionally comprising the step of forming one or more areas of depression of polymerized crosslinkable material.

9. The method of claim 1 additionally comprising the step of forming one or more elevated areas of polymerized crosslinkable material.

10. The method of claim 8 wherein the volume of crosslinkable material comprises a layered volume which is polymerized beyond the gel point so that it is conformal to the areas of depression formed by the voxels of polymerized crosslinkable material.

11. The method of claim 8 wherein the volume of crosslinkable material comprises a layered volume which is polymerized beyond the gel point so that it is non-conformal to the areas of depression formed by the voxels of polymerized crosslinkable material.

12. The method of claim 4 wherein the first portion comprises a non-contiguous pattern formed along a surface of the substrate.

13. The method of claim 4 further comprising the step of forming a lens from said precursor, wherein the perimeter of the lens essentially comprises a non-circular shape.

14. The method of claim 4 further comprising the step of forming a lens from said precursor, wherein the perimeter of the lens essentially comprises an oval shape.

15. The method of claim 4 further comprising the step of forming a lens from said precursor, wherein the lens comprises a toric shape.

* * * * *